US012793714B2

(12) United States Patent
Smith et al.

(10) Patent No.: US 12,793,714 B2
(45) Date of Patent: Nov. 10, 2026

(54) DEVICES, SYSTEMS, AND METHODS FOR DISTRIBUTED VOICE PROCESSING

(71) Applicant: Sonos, Inc., Goleta, CA (US)

(72) Inventors: Connor Kristopher Smith, New Hudson, MI (US); John Tolomei, Renton, WA (US); Betty Lee, Cambridge, MA (US)

(73) Assignee: Sonos, Inc., Goleta, CA (US)

( * ) Notice: Subject to any disclaimer, the term of this patent is extended or adjusted under 35 U.S.C. 154(b) by 60 days.

(21) Appl. No.: 18/949,868

(22) Filed: Nov. 15, 2024

(65) Prior Publication Data

US 2025/0174229 A1 May 29, 2025

Related U.S. Application Data

(63) Continuation of application No. 18/192,452, filed on Mar. 29, 2023, now Pat. No. 12,165,643, which is a continuation of application No. 17/247,507, filed on Dec. 14, 2020, now Pat. No. 11,646,023, which is a continuation of application No. 16/271,560, filed on Feb. 8, 2019, now Pat. No. 10,867,604.

(51) Int. Cl.

| | |
|---|---|
| ***G10L 15/30*** | (2013.01) |
| ***G10L 15/08*** | (2006.01) |
| ***G10L 15/22*** | (2006.01) |
| ***H04R 1/40*** | (2006.01) |
| ***H04R 3/00*** | (2006.01) |

(52) U.S. Cl.

CPC .............. *G10L 15/22* (2013.01); *G10L 15/08* (2013.01); *G10L 15/30* (2013.01); *H04R 1/406* (2013.01); *H04R 3/005* (2013.01); *G10L 2015/088* (2013.01); *G10L 2015/223* (2013.01)

(58) Field of Classification Search

CPC ......... G10L 15/22; G10L 15/08; G10L 15/30; G10L 2015/088; G10L 2015/223; H04R 1/406; H04R 3/005; H04R 2227/003; H04R 27/00; H04R 2227/005; G06F 3/167

See application file for complete search history.

(56) References Cited

U.S. PATENT DOCUMENTS

| | | | | |
|---|---|---|---|---|
| 10,586,534 | B1 * | 3/2020 | Argyropoulos | G10L 15/22 |
| 10,867,604 | B2 * | 12/2020 | Smith | H04R 27/00 |
| 10,971,158 | B1 * | 4/2021 | Patangay | H04L 67/10 |

(Continued)

*Primary Examiner* — Abul K Azad

(74) *Attorney, Agent, or Firm* — Fortem IP LLP

(57) ABSTRACT

Systems and methods for distributed voice processing are disclosed herein. In one example, the method includes detecting sound via a microphone array of a first playback device and analyzing, via a first wake-word engine of the first playback device, the detected sound. The first playback device may transmit data associated with the detected sound to a second playback device over a local area network. A second wake-word engine of the second playback device may analyze the transmitted data associated with the detected sound. The method may further include identifying that the detected sound contains either a first wake word or a second wake word based on the analysis via the first and second wake-word engines, respectively. Based on the identification, sound data corresponding to the detected sound may be transmitted over a wide area network to a remote computing device associated with a particular voice assistant service.

20 Claims, 17 Drawing Sheets

(56) References Cited

U.S. PATENT DOCUMENTS

| | | | | |
|---|---|---|---|---|
| 11,024,307 | B2 * | 6/2021 | Choi | G10L 15/22 |
| 11,164,570 | B2 * | 11/2021 | Nadkar | G06F 3/167 |
| 11,646,023 | B2 * | 5/2023 | Smith | G06F 3/167 704/251 |
| 12,165,643 | B2 * | 12/2024 | Smith | G10L 15/22 |
| 2019/0074014 | A1 * | 3/2019 | Wilberding | G06F 3/167 |

* cited by examiner

DEVICES, SYSTEMS, AND METHODS FOR DISTRIBUTED VOICE PROCESSING

CROSS-REFERENCE TO RELATED APPLICATIONS

The present application is a continuation of U.S. patent application Ser. No. 18/192,452, filed Mar. 29, 2023, now U.S. Pat. No. 12,165,643, which is a continuation of U.S. patent application Ser. No. 17/247,507, filed Dec. 14, 2020, now U.S. Pat. No. 11,646,023, which is a continuation of U.S. patent application Ser. No. 16/271,560, filed Feb. 8, 2019, now U.S. Pat. No. 10,867,604, each of which is incorporated herein by reference in its entirety. This application is also related to U.S. application Ser. No. 16/271,550, filed Feb. 8, 2019, now U.S. Pat. No. 11,315,556, which is also incorporated herein by reference in its entirety.

TECHNICAL FIELD

The present technology relates to consumer goods and, more particularly, to methods, systems, products, features, services, and other elements directed to voice-controllable media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1A:
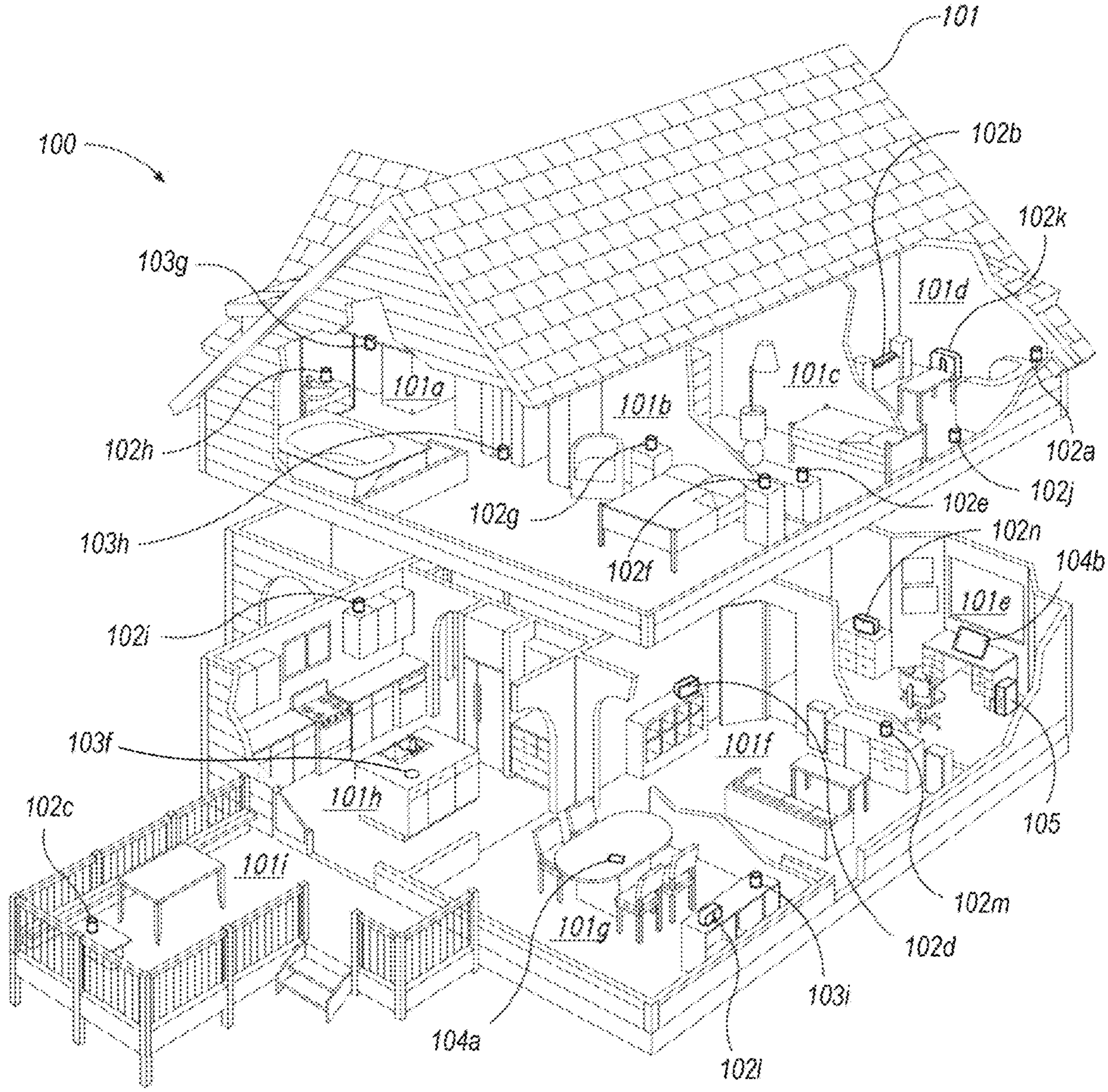
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103*a* is first introduced and discussed with reference to FIG. 1A.

DETAILED DESCRIPTION

I. Overview

Voice control can be beneficial in a "smart" home that includes smart appliances and devices that are connected to a communication network, such as wireless audio playback devices, illumination devices, and home-automation devices (e.g., thermostats, door locks, etc.). In some implementations, network microphone devices may be used to control smart home devices.

A network microphone device ("NMD") is a networked computing device that typically includes an arrangement of microphones, such as a microphone array, that is configured to detect sounds present in the NMD's environment. The detected sound may include a person's speech mixed with background noise (e.g., music being output by a playback device or other ambient noise). In practice, an NMD typically filters detected sound to remove the background noise from the person's speech to facilitate identifying whether the speech contains a voice input indicative of voice control. If so, the NMD may act based on such a voice input.

An NMD often employs a wake-word engine, which is typically onboard the NMD, to identify whether sound detected by the NMD contains a voice input that includes a particular wake word. The wake-word engine is a type of voice-input identification engine that is configured to identify (i.e., "spot") a particular keyword (e.g., a wake word) using one or more identification algorithms, using e.g., natural-language understanding (NLU), machine learning, and/or other suitable algorithms. In practice, to help facilitate wake-word spotting, the NMD may buffer sound detected by a microphone of the NMD and then use the wake-word engine to process that buffered sound to determine whether a wake word is present.

When a wake-word engine spots a wake word in detected sound, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. In some implementations, these additional processes may include outputting an alert (e.g., an audible chime and/or a light indicator) indicating that a wake word has been identified and extracting detected-sound data from a buffer, among other possible additional processes. Extracting the detected sound may include reading out and packaging a stream of the detected-sound according to a particular format and transmitting the packaged sound-data to an appropriate VAS for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices. Additionally, or alternatively, a VAS may take the form of a local service implemented at an NMD or a media playback system comprising the NMD such that a voice input or certain types of voice input (e.g., rudimentary commands) are processed locally without intervention from a remote VAS.

In any case, when a VAS receives detected sound data, the VAS will typically process this data, which involves identifying the voice input and determining an intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over another based on the particular wake word identified in the sound detected by the NMD.

In some implementations, a playback device that is configured to be part of a networked media playback system may include components and functionality of an NMD (i.e., the playback device is "NMD-equipped"). In this respect, such a playback device may include a microphone that is configured to detect sounds present in the playback device's environment, such as people speaking, audio being output by the playback device itself or another playback device that is nearby, or other ambient noises, and may also include components for buffering detected sound to facilitate wake-word identification.

Some NMD-equipped playback devices may include an internal power source (e.g., a rechargeable battery) that allows the playback device to operate without being physically connected to a wall electrical outlet or the like. In this regard, such a playback device may be referred to herein as a "portable playback device." On the other hand, playback devices that are configured to rely on power from a wall electrical outlet or the like may be referred to herein as "stationary playback devices," although such devices may in fact be moved around a home or other environment. In practice, a person might often take a portable playback device to and from a home or other environment in which one or more stationary playback devices remain.

In some cases, multiple voice services are configured for the NMD, or a system of NMDs (e.g., a media playback system of playback devices). One or more services can be configured during a set-up procedure, and additional voice services can be configured for the system later on. As such, the NMD acts as an interface with multiple voice services, perhaps alleviating a need to have an NMD from each of the voice services to interact with the respective voice services. Yet further, the NMD can operate in concert with service-specific NMDs present in a household to process a given voice command.

Where two or more voice services are configured for the NMD, a particular voice service can be invoked by utterance of a wake word corresponding to the particular voice service. For instance, in querying AMAZON, a user might speak the wake word "Alexa" followed by a voice command. Other examples include "Ok, Google" for querying GOOGLE and "Hey, Siri" for querying APPLE.

In some cases, a generic wake word can be used to indicate a voice input to an NMD. In some cases, this is a manufacturer-specific wake word rather than a wake word tied to any particular voice service (e.g., "Hey, Sonos" where the NMD is a SONOS playback device). Given such a wake word, the NMD can identify a particular voice service to process the request. For instance, if the voice input following the wake word is related to a particular type of command (e.g., music playback), then the voice input is sent to a particular voice service associated with that type of command (e.g. a streaming music service having voice command capabilities).

It can be difficult to manage the association between various playback devices with one or more corresponding VASes. For example, although a user may wish to utilize multiple VASes within her home, it may not be possible or preferable to associate a single playback device with more than one VAS. This may be due to the constraints of processing power and memory required to perform multiple wake word detection algorithms on a single device, or it may be due to restrictions imposed by one or more VASes. As a result, for any particular playback device, a user may be required to select only a single VAS to the exclusion of any other VASes.

In some instances, a playback device may be purchased with a pre-associated VAS. In such instances, a user may wish to replace the pre-associated VAS with a different VAS of the user's choosing. Additionally, some voice-enabled playback devices may be sold without any pre-associated VAS, in which cases a user may wish to manage the selection and association of a particular VAS with the playback device.

The systems and methods detailed herein address the above-mentioned challenges of managing associations between one or more playback devices and one or more VASes. In particular, systems and methods are provided for distributing wake word detection (and other voice processing functions) across multiple playback devices. As described in more detail below, in some instances the media playback system may include playback devices that are configured to detect different wake words and communicate with different VASes. For example, the media playback system may include a first playback device having a wake word engine associated with a first VAS (such as AMAZON's ALEXA) and configured to detect an associated first wake word (e.g., "Alexa"), and a second playback device having a second wake word engine associated with a second, different VAS (such as GOOGLE's ASSISTANT) and configured to detect a second, different wake word (e.g., "OK, Google"). In some aspects of the technology, the second playback device relies on sound detected by the first playback device for detecting the second wake word, thereby leveraging the existing voice processing capabilities (such as wake word detection) of the second playback device, even instances where the second playback device does not include any of its own microphones. Utilizing the wake word engine of the first playback device distributes the processing time and power associated with wake word detection, and thus frees up computational resources on both the first and second playback devices (as compared to a single playback device with two wake word engines). Moreover, distributed wake word detection may also allow a user to realize the benefits of multiple VASes, each of which may excel in different aspects, rather than requiring a user to limit her interactions to a single VAS to the exclusion of any others.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
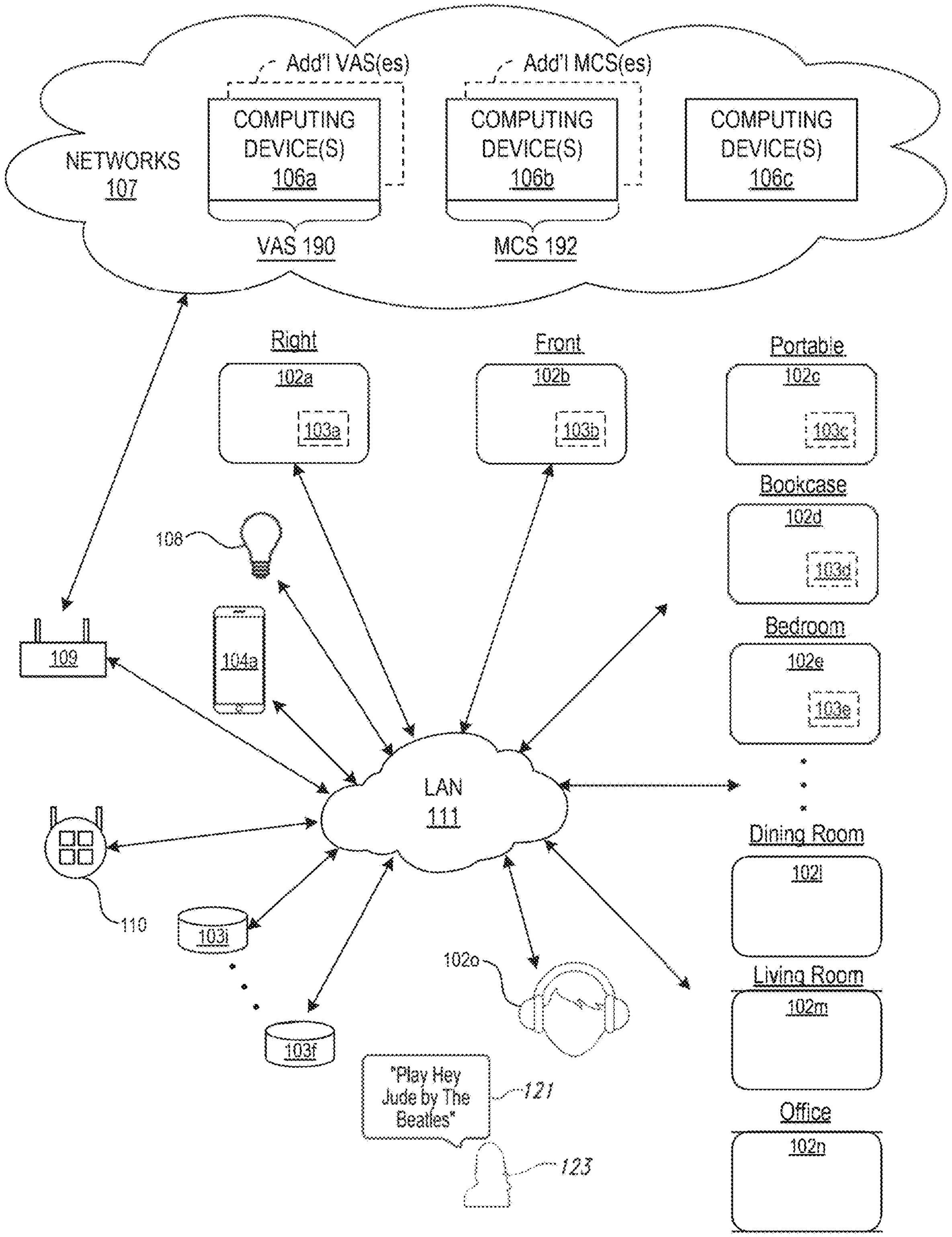
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b* (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-102*o*), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a-e* include or are otherwise equipped with corresponding NMDs 103*a-e*, respectively. A playback device that includes or is otherwise equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 111 (FIG. 1B) may be eliminated and the single playback device 102 and/or the single NMD 103 may communicate directly with the remote computing devices 106*a-d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
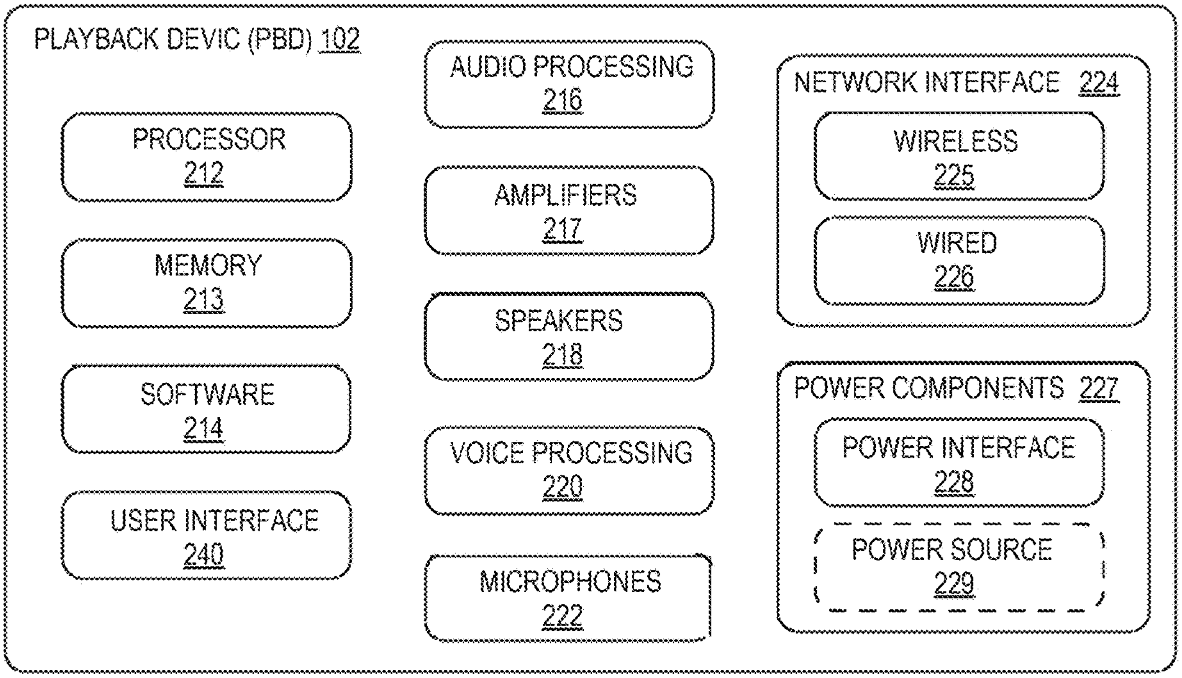
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. patent application Ser. No. 15/438,749.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
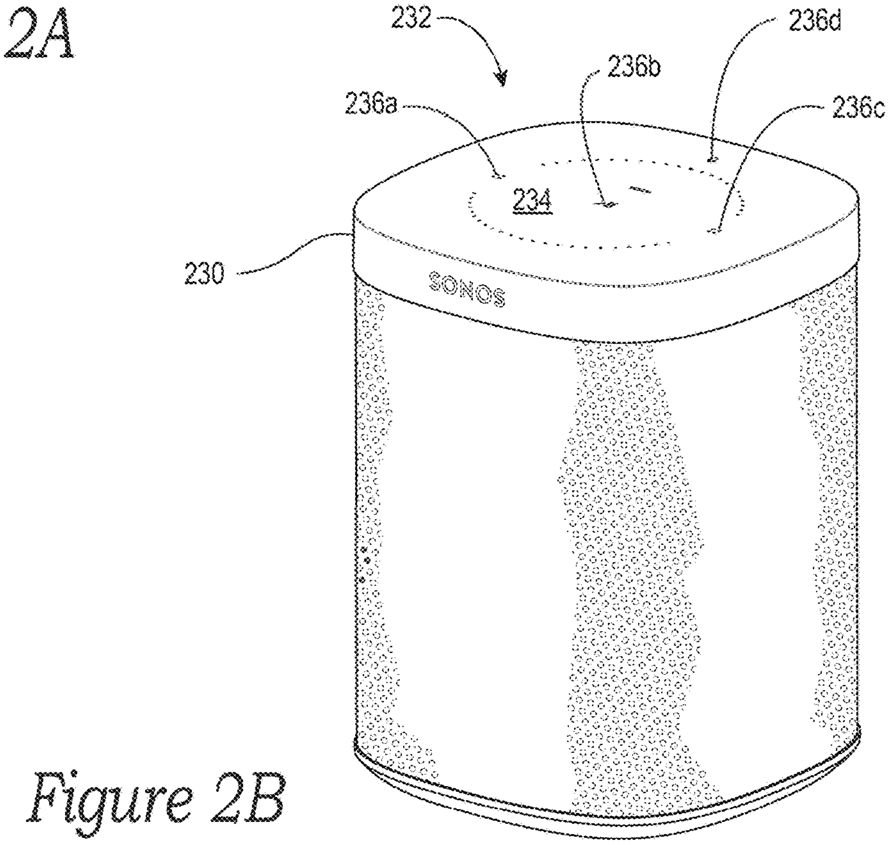
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236*a-c* for controlling audio playback, volume level, and other functions. The control area 232 also includes a button 236*d* for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3B:
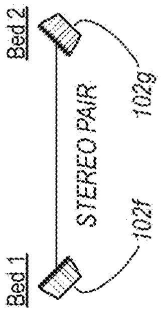
FIGS. 3A-3E are diagrams showing example playback device configurations in accordance with aspects of the disclosure.
Figure 3C:
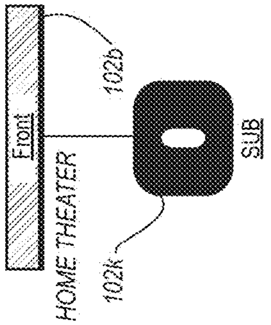
Figure 3D:
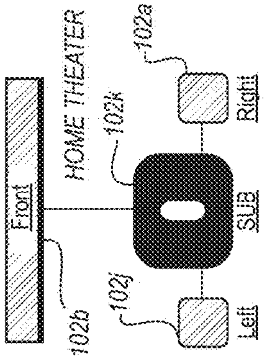
Figure 3E:
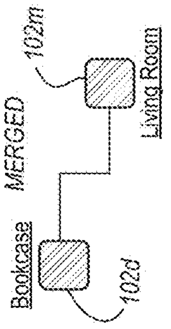
Figure 3A:
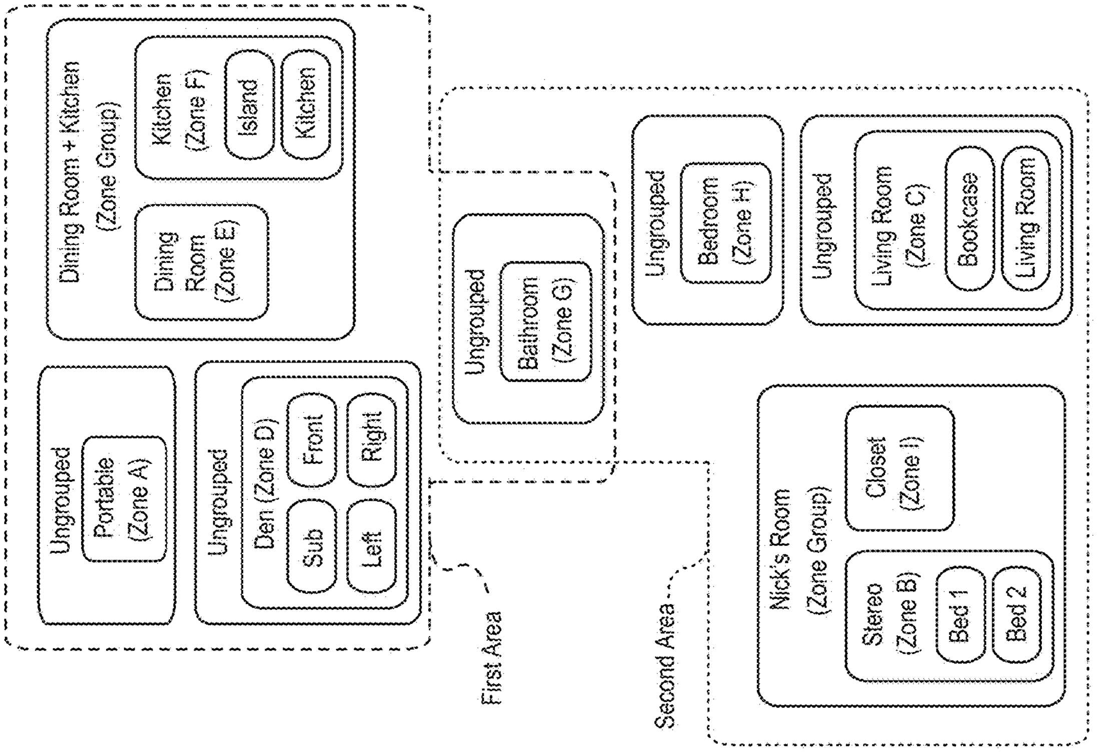

FIGS. 3A-3E show example configurations of playback devices. Referring first to FIG. 3A, in some example instances, a single playback device may belong to a zone. For example, the playback device 102*c* (FIG. 1A) on the Patio may belong to Zone A. In some implementations described below, multiple playback devices may be "bonded" to form a "bonded pair," which together form a single zone. For example, the playback device 102*f* (FIG. 1A) named "Bed 1" in FIG. 3A may be bonded to the playback device 102*g* (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102*d* named "Bookcase" may be merged with the playback device 102*m* named "Living Room" to form a single Zone C. The merged playback devices 102*d* and 102*m* may not be specifically assigned different playback responsibilities. That is, the merged playback devices 102*d* and 102*m* may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "al" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102*c*, while another user may be preparing food in the Kitchen zone and listening to classical music being played by the playback device 102*i*. In another example, a playback zone may play the same audio content in synchrony with another playback zone. For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

Figure 4A:
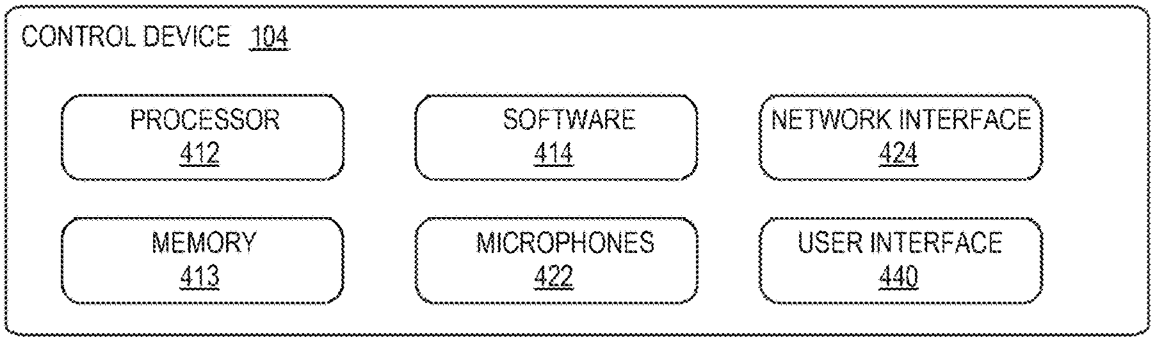
FIG. 4A is a functional block diagram of an example controller device in accordance with aspects of the disclosure.

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

Figure 4B:
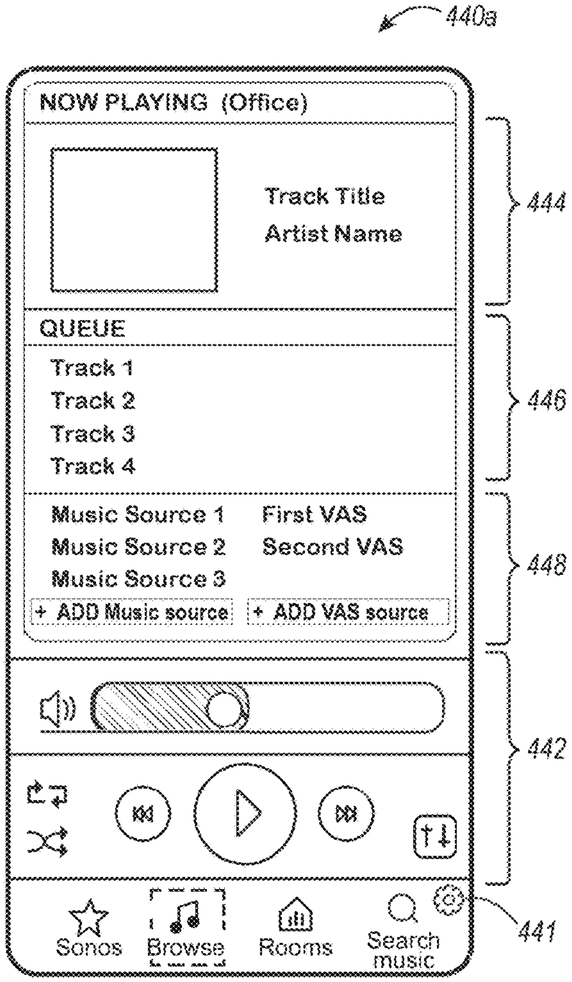
FIGS. 4B and 4C are controller interfaces in accordance with aspects of the disclosure.
Figure 4C:
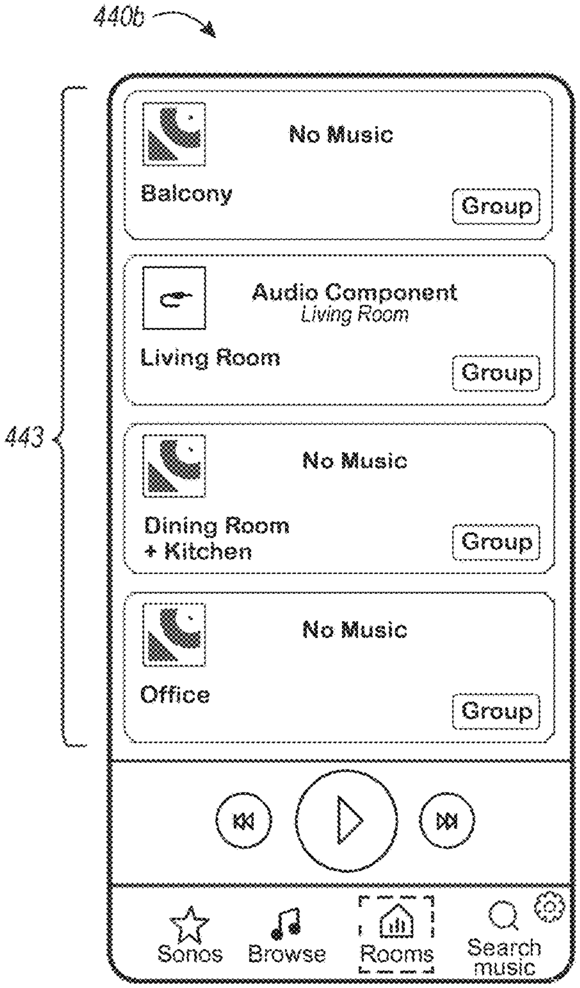

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440*a* and 440*b* shown in FIGS. 4B and 4C. Referring to FIGS. 4B and 4C together, the controller interfaces 440*a* and 440*b* includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
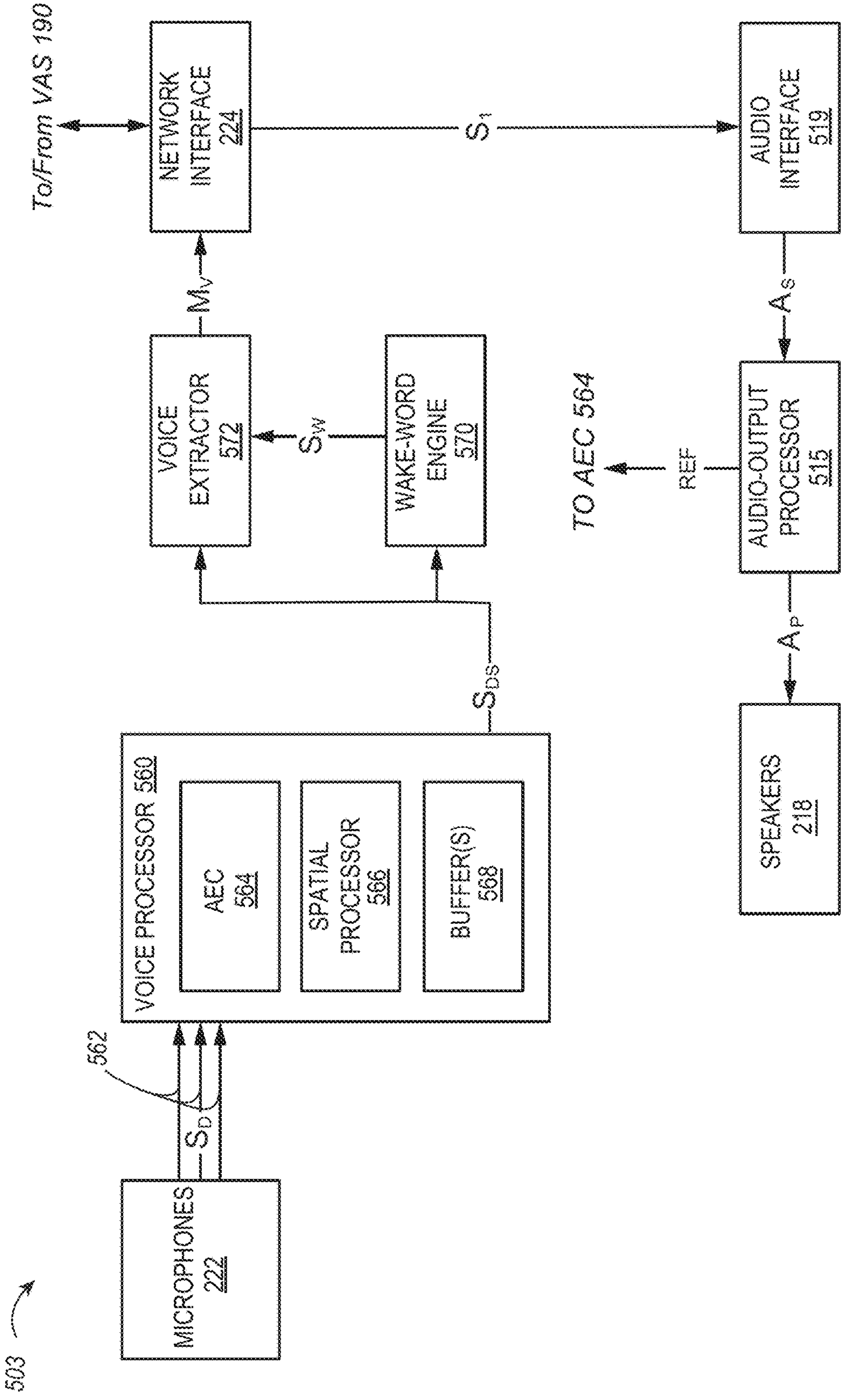
FIG. 5 is a functional block diagram of certain components of an example playback device in accordance with aspects of the disclosure.

FIG. 5 is a functional block diagram showing an NMD 503 configured in accordance with embodiments of the disclosure. The NMD 503, for example, may be configured for use with the MPS 100 and may be in communication with any of the playback and/or network microphone devices described herein. As noted above, in some implementations an NMD may be standalone, while in other implementations be a playback device or a different device, such as smart household appliance (e.g., a smart washing machine, microwave, etc.). As shown in FIG. 5, The NMD 503 includes a voice processor 560, a wake-word engine 570, and at least one voice extractor 572, each of which is operably coupled to the voice processor 560. The NMD 503 may be NMD-equipped such that it includes the microphones 222 and the at least one network interface 224 described above. The NMD 503 may also include other components, such as audio amplifiers, etc., which are not shown in FIG. 5 for purposes of clarity.

The microphones 222 of the NMD 503 are configured to provide detected sound, $S_D$, from the environment of the NMD 503 to the voice processor 560. The detected sound $S_D$ may take the form of one or more analog or digital signals. In example implementations, the detected sound $S_D$ may be composed of a plurality of signals associated with respective channels 562 that are fed to the voice processor 560. Each channel 562 may provide all or a portion of the detected sound $S_D$ to the voice processor 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 5, the voice processor 560 includes one or more voice capture components, such as an AEC 564, a spatial processor 566, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band-a measure of spectral structure-which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 568—one or more of which may be part of or separate from the memory 213 (FIG. 2A)—capture data corresponding to the detected sound $S_D$. More specifically, the one or more buffers 568 capture detected-sound data that was processed by the upstream AEC 564 and spatial processor 566. The detected-sound and/or any associated data may be referred to as a "sound specimen" when retained in at least one buffer 568. A sound specimen may comprise, for example, (a) audio data or (b) audio data and metadata regarding the audio data. As an example, a first buffer may temporarily retain audio samples used for streaming audio data, as described below. A second buffer may temporarily retain metadata (e.g., spectral data, sound pressure-level, etc.) regarding the current audio samples in the first buffer, a certain number of audio samples captured prior to the current audio samples, and/or a certain number of audio samples captured after the current audio samples. In some implementations, this type of second buffer may be referred as a look-back buffer. Additional details describing buffers, including look-back buffers, and configurations of buffers with voice processors (e.g., spatial processors) may be found in, for example, U.S. patent application Ser. No. 15/989,715, filed May 25, 2018, titled "Determining and Adapting to Changes in Microphone Performance of Playback Devices," U.S. patent application Ser. No. 16/138,111, filed Sep. 21, 2018, titled "Voice Detection Optimization Using Sound Metadata," and U.S. patent application Ser. No. 16/141,875, filed Sep. 25, 2018, titled "Voice Detection Optimization Based on Selected Voice Assistant Service," all of which are incorporated by reference herein in their entireties.

In general, the detected-sound data form a digital representation (i.e., sound-data stream), $S_{DS}$, of the sound detected by the microphones 222. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained as a sound specimen in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, components of the NMD 503 downstream of the voice processor 560 may process the sound-data stream $S_{DS}$. For instance, the wake-word engine 570 can be configured to apply one or more identification algorithms to the sound-data stream $S_{DS}$ (e.g., streamed sound frames) to spot potential wake words in the detected-sound $S_D$. Many first- and third-party wake word detection algorithms are known and commercially available. Different voice services (e.g. AMAZON's ALEXA, APPLE's SIRI, MICROSOFT's CORTANA, GOOGLE'S ASSISTANT, etc.), for example, each use a different wake word for invoking their respective voice service, and some voice services make their algorithms available for use in third-party devices. In some embodiments, the wake-word engine 570 is configured to run multiple wake word detection algorithms on the received audio simultaneously (or substantially simultaneously). To support multiple voice services, the wake-word engine 570 may run the received sound-data stream $S_{DS}$ through the wake word detection algorithm for each supported voice service in parallel. In such embodiments, the NMD 503 may include VAS selector components (not shown) configured to pass voice input to the appropriate voice assistant service. In other embodiments, the VAS selector components may be omitted, such as when each of the NMD's wake-word engine(s) are dedicated to the same VAS.

In any event, when a particular wake-word engine 570 spots a potential wake word, that wake-word engine can provide an indication of a "wake-word event" (also referred to as a "wake-word trigger"). The indication of the wake-word event, in turn, can cause the NMD to invoke the VAS associated with the triggered wake-word engine.

In the example shown in FIG. 5, a triggered wake-word engine 570 produces a signal $S_W$, which causes the voice extractor 572 to initiate streaming of the sound-data stream $S_{DS}$. More specifically, in response to the wake-word event (e.g., in response to a signal $S_W$ from the wake-word engine 570 indicating the wake-word event), the voice extractor 572 is configured to receive and format (e.g., packetize) the sound-data stream $S_{DS}$. For instance, the voice extractor 572 may packetize the frames of the sound-data stream $S_{DS}$ into messages, $M_V$, for relaying the sound-data to a VAS over a network. In the example shown in FIG. 5, the voice extractor 572 transmits or streams these messages in real time or near real time, to one or more remote computing devices associated with a VAS, such as the VAS 190 (FIG. 1B), via the network interface 224.

Figure 6A:
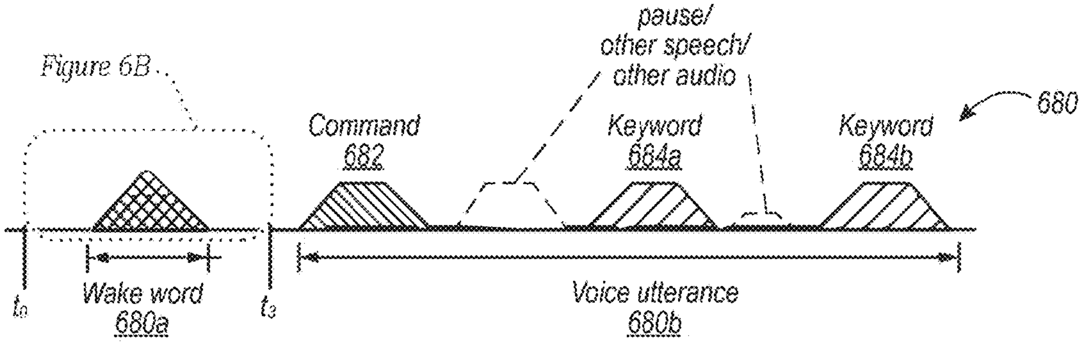
FIG. 6A is a diagram of an example voice input.

The VAS is configured to process the sound-data stream $S_{DS}$ contained in the messages $M_V$ sent from the NMD 503. More specifically, the VAS is configured to identify any voice input based on the sound-data stream $S_{DS}$ and/or data derived from the sound-data stream $S_{DS}$. Referring to FIG. 6A, a voice input 680 may include a wake-word portion 680*a* and an utterance portion 680*b*. The wake-word portion 680*a* corresponds to detected sound that caused the wake-word event. For instance, the wake-word portion 680*a* corresponds to detected sound that caused the wake-word engine 570 to provide an indication of a wake-word event to the voice extractor 572. The utterance portion 680*b* corresponds to detected sound that potentially comprises a user request following the wake-word portion 680*a*.

Figure 6B:
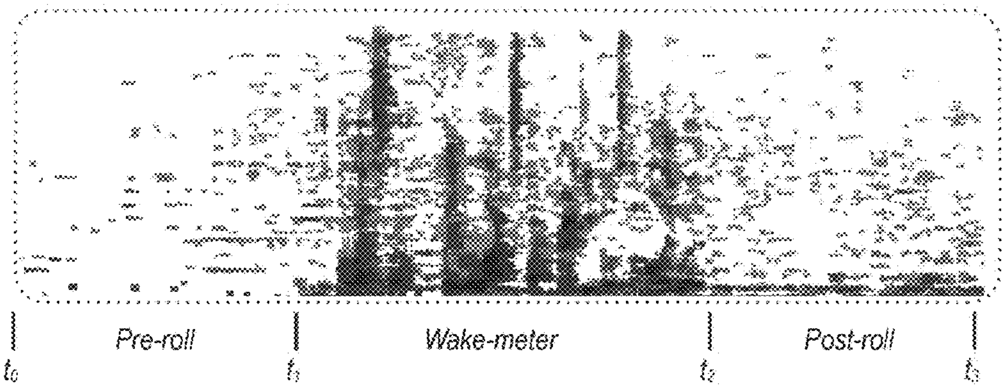
FIG. 6B is a graph depicting an example sound specimen in accordance with aspects of the disclosure.

As an illustrative example, FIG. 6B shows an example first sound specimen. In this example, the sound specimen corresponds to detected-sound data that is streamed, e.g., as part of the sound-data stream $S_{DS}$. This detected-sound data can include audio frames associated with the spotted wake word 680*a* of FIG. 6A. As illustrated, the example first sound specimen comprises sound detected in the NMD 503's (FIG. 5) environment (i) immediately before a wake word was spoken, which may be referred to as a pre-roll portion (between times $t_0$ and $t_1$), (ii) while the wake word was spoken, which may be referred to as a wake-meter portion (between times $t_1$ and $t_2$), and/or (iii) after the wake word was spoken, which may be referred to as a post-roll portion (between times $t_2$ and $t_3$). Other sound specimens are also possible.

Typically, the VAS may first process the wake-word portion 680*a* within the sound-data stream $S_{DS}$ to verify the presence of the wake word. In some instances, the VAS may determine that the wake-word portion 680*a* comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. The wake-word engine 570 may resume or continue monitoring sound specimens until another potential wake word, leading to another wake-word event. In some implementations, the VAS may not process or receive the wake-word portion 680*a* but instead processes only the utterance portion 680*b*.

In any case, the VAS processes the utterance portion 680*b* to identify the presence of any words in the detected-sound data and to determine an underlying intent from these words. The words may correspond to a certain command and certain keywords 684 (identified individually in FIG. 6A as a first keyword 684*a* and a second keyword 684*b*). A keyword may be, for example, a word in the voice input 680 identifying a particular device or group in the MPS 100. For instance, in the illustrated example, the keywords 684 may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion 680*b* may include additional information, such as detected pauses (e.g., periods of non-speech) between words spoken by a user, as shown in FIG. 6A. The pauses may demarcate the locations of separate commands, keywords, or other information spoke by the user within the utterance portion 680*b*.

Based on certain command criteria, the VAS may take actions as a result of identifying one or more commands in the voice input, such as the command 682. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

After processing the voice input, the VAS may send a response Si to the NMD 503 via network interface 224 with an instruction to perform one or more actions based on an intent it determined from the voice input. For example, based on the voice input, the VAS may direct the NMD 503, or the MPS 100 via the NMD 503, to initiate playback on one or more of the playback devices 102, control one or more of these devices (e.g., raise/lower volume, group/ungroup devices, etc.), turn on/off certain smart devices, among other actions. After receiving the response from the VAS, the wake-word engine 570 the NMD 503 may resume or continue to monitor the sound-data stream $S_{DS}$ until it spots another potential wake-word, as discussed above.

The NMD 503 may be operatively coupled to playback components of a playback device, of which the NMD 503 may form a part in various embodiments. The playback components can include an audio interface 519, an audio-output processor 515, and speakers 218. One, some, or all of the playback components may be on-board a playback device comprising the NMD 503, or may be associated with a different playback device of MPS 100. The network interface 224 may communicate a signal Si to the audio interface 519 based on the response from the VAS, and the audio interface 519 may transmit an audio signal $A_S$ to the audio-output processor 515. The audio-output processor 515, for example, may comprise one or more of the audio processing components 216 discussed above with reference to FIG. 2A. Finally, the audio-output processor 515 transmits the processed audio signal $A_P$ to the speakers 218 of a playback device for playback. The audio-output processor 515 may also transmit one or more reference signals REF to the AEC 564 based on the processed audio signal $A_P$ to suppress echoed audio components from the audio content played back by a playback device that may otherwise be present in detected sound $S_D$.

In some implementations, the NMD 503 may include one or more other voice-input identification engines (not shown), in addition to or in lieu of the one or more wake word engines 570, that enable the NMD 503 to operate without the assistance of a remote VAS. As an example, such an engine may identify in detected sound certain commands (e.g., "play," "pause," "turn on," etc.) and/or certain keywords or phrases, such as the unique name assigned to a given playback device (e.g., "Bookcase," "Patio," "Office," etc.). In response to identifying one or more of these commands, keywords, and/or phrases, the NMD 503 may communicate a signal (not shown in FIG. 5) that causes the audio processing components 216 (FIG. 2A) to perform one or more actions. For instance, when a user says "Hey Sonos, stop the music in the office," the NMD 503 may communicate a signal to the office playback device 102*n*, either directly, or indirectly via one or more other devices of the MPS 100, which causes the office device 102*n* to stop audio playback. Reducing or eliminating the need for assistance from a remote VAS may reduce latency that might otherwise occur when processing voice input remotely. In some cases, the identification algorithms employed may be configured to identify commands that are spoken without a preceding wake word. For instance, in the example above, the NMD 503 may employ an identification algorithm that triggers an event to stop the music in the office without the user first saying "Hey Sonos" or another wake word.

III. Example Systems and Methods for Distributed Voice Processing

FIGS. 7A-7E depict networked playback devices 702 (identified individually as a first playback device 702*a* and a second playback device 702*b*) configured to distribute voice processing in accordance with the present technology. The playback devices 702, for example, may be part of a media playback system (such as MPS 100). In some embodiments, the playback devices 702 may be positioned in various areas of an environment (e.g., a household), such as in different rooms, or in the same room. For example, the first playback device 702*a* may be positioned in a first area, such as "Room 1" (as shown), and the second playback device may be positioned in a second area, such as within Room 1 or a different room (e.g., "Room 2"). As described in greater detail below, the playback devices 702 may be configured to share the workload of one or more voice processing functions, such as voice-input detection, including wake-word detection. Although the methods described below are with reference to two playback devices, the methods of the present technology include distribution of one or more voice processing functions (such as wake-word detection) across more than two playback devices (e.g., 3 playback devices, 4 playback devices, 8 playback devices, twenty playback devices, etc.).

Figure 7A:
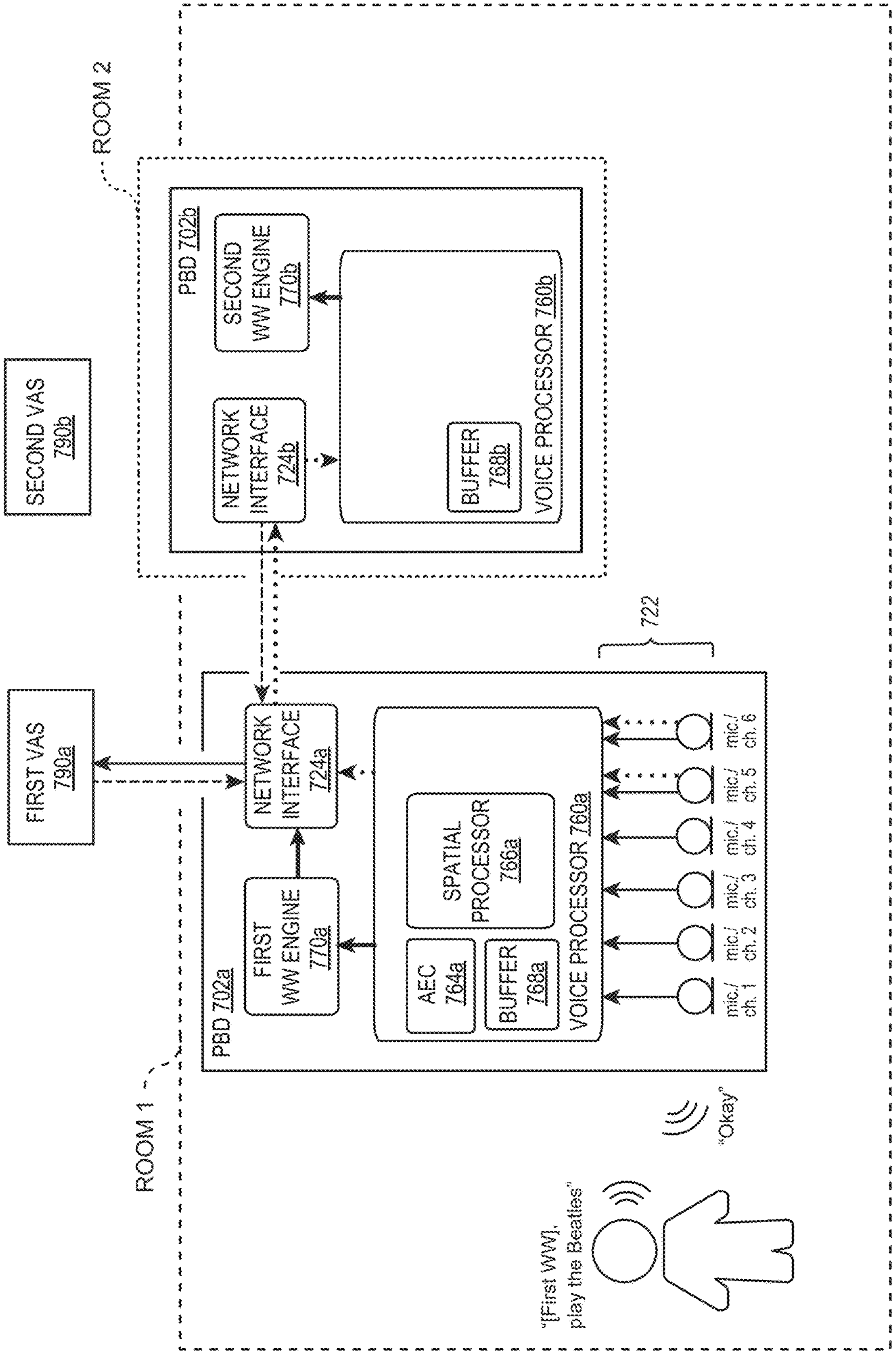
FIG. 7A is an example network configuration in accordance with aspects of the disclosure.

As shown in FIG. 7A, each of the playback devices 702 may include components that are generally similar to components of the playback and network microphone devices described above. For example, the playback devices 702 may include playback components (not shown) such as an audio interface, an audio-output processor, speakers, etc. The playback devices 702 further include voice processing components that may be similar to some or all of the voice processing components of the NMD 503 described above with reference to FIG. 5. For example, the first and second playback devices 702*a* and 702*b* include respective first and second voice processors 760*a* and 760*b* (collectively "voice processors 760"), first and second wake word engines 770*a* and 770*b* (collectively "wake word engines 770") associated with respective first and second VASes 790*a* and 790*b*. The first and second playback devices 702*a* and 702*b* further include respective first and second network interfaces 724*a* and 724*b* (collectively "network interfaces") configured to communicate with one another over local and/or wide area networks. The first and second network interfaces 724*a* and 724*b* may also be configured to communicate with other computing devices of the MPS 100 and/or one or more remote servers (such as those associated with a VAS) over local and/or wide area networks.

The first voice processor 760 of the first playback device 702*a* may include voice processing components, such as a first AEC 764*a*, a first spatial processor 766, and a first buffer 768*a*. The components of the first voice processor 760*a* are configured to process and feed the detected sound to the first wake-word engine 770*a* (represented by arrow I(a)). The first wake-word engine 770*a* may be configured to detect a first wake word specific to the first VAS 790*a*. For example, the first wake word engine 770*a* may be associated with AMAZON's ALEXA and be configured to run a corresponding wake word detection algorithm (e.g., configured to detect the wake word "Alexa" or other associated wake word). The first wake word engine 770*a* may be configured to detect only wake words associated with the first VAS 790*a* (such as the first wake word), and cannot detect wake words associated with a different VAS (such as a second VAS 790*b*, described below).

In the example depicted in FIG. 7A, the second voice processor 760*b* includes a second buffer 768*b* and does not include an AEC and a spatial processor. Such a configuration may be beneficial, for example, as wake word engines associated with certain VASes, such as GOOGLE's ASSISTANT, may not require acoustic echo cancellation and/or spatial processing for wake word detection. In other embodiments, the second voice processor 760*b* may not include a buffer and/or may include an AEC, a spatial processor, and/or other voice processing components. In any event, the components of the second voice processor 760*b* are configured to process and feed detected sound data to the second voice processor 760*b* via the network interfaces 724 (represented by arrows I(b)-I(d)). The second playback device 702*b* and/or the second wake word engine 770*b* may be associated with the second VAS 790*b* and configured to detect a second wake word specific to the second VAS 790*b* that is different than the first wake word. For example, the second wake word engine 770*b* may be associated with GOOGLE's ASSISTANT and configured to run a corresponding wake word detection algorithm (e.g., configured to detect the wake word "OK, Google" or other associated wake word). Thus, in some aspects of the technology, the first and second wake word engines 770*a* and 770*b* are configured to detect different wake words associated with different VASes.

In one aspect, the first playback device 702*a* may be configured to be NMD-equipped in a manner similar to that described above with reference to NMD 503 (FIG. 5). For example, the first playback device 702*a* includes a plurality of on-board microphones 722 (e.g., far field microphones) configured to detect sound. In the illustrated example, the first playback device 702*a* has six microphones 722 and six corresponding channels (labeled as "mic/ch. 1," "mic/ch. 2," etc.). In other embodiments, the first playback device 702*a* may have more or fewer than six microphones or channels. The sound detected by the microphones 722 may be processed by the first voice processor 760*a* and fed to the first wake-word engine 770*a* and the first network interface 724*a*. In the example depicted in FIG. 7A, the first voice processor 760*a* transmits the processed detected sound from microphones 1-6 to the first wake word engine 770*a*, and transmits the processed detected sound from microphones 5 and 6 to the first network interface 724*a* (for subsequent transmission to the second playback device 702*b*, detailed below).

The second playback device 702*b* may also be configured to be NMD-equipped but in a different manner than that of the first playback device 702*a*. In contrast to the first playback device 702*a*, the second playback device 702*b* does not have any on-board microphones. Instead, the second playback device 702*b* is configured to receive and process sound detected by the microphones 722 of the first playback device 702*a* (via communication of the first and second network interfaces 724*a* and 724*b*). The second playback device 702*b* may receive the detected sound in the form of raw mic data or processed sound data (e.g., pre-processed by the first voice processor 760*a*). In the example shown in FIG. 7A, the second playback device 702*b* receives detected sound from a designated subset of the microphones 722 (e.g., microphones 5 and 6). In other embodiments, the second playback device 702*b* may receive detected sound from more or fewer microphones 722 of the first playback device 702*a* (e.g., 1 microphone, 4 microphones, all of the available microphones, etc.).

As noted above, the detected sound (from the first playback device 702*a*) is passed via the second network interface (represented by arrow I(d)) to the second voice processor 760*b* which processes and transmits the detected sound to the second wake word engine 770*b* (represented by arrow I(e)). The second wake word engine 770*b* then processes the detected sound for detection of the second wake word, which may occur before, after, or while the first wake word engine 770*a* processes the detected sound for the first wake word. As such, the first and second playback devices 702*a*, 702*b* are configured to monitor sound detected by the microphones 722 of the first playback device 702*a* for different wake words associated with different VASes which allows a user to realize the benefits of multiple VASes, each of which may excel in different aspects, rather than requiring a user to limit her interactions to a single VAS to the exclusion of any others. Moreover, the distribution of wake word detection across multiple playback devices of the system frees up computational resources (e.g., processing time and power) (as compared to a single playback device with two wake word engines). As such, the playback devices of the present technology may be configured to efficiently process detected sound, thereby enhancing the responsiveness and accuracy of the media playback system to a user's command.

In various embodiments, the data transmitted from the first playback device 702*a* to the second playback device 702*b* may comprise, for example, raw microphone data and/or processed sound data from one, some or all of the microphones (e.g., after being processed by one or more of the first AEC 764*a* and the first spatial processor 766*a*). Processing the data to be transmitted may include compressing the data prior to transmission. In some implementations, it may be beneficial to perform acoustic echo cancellation (via the first AEC 764*a*) with the reference signal(s) before transmitting the detected sound to reduce bandwidth. In some embodiments, the second AEC 764*b* may be bypassed or omitted from the second voice processor 760*b* in configurations in which acoustic cancellation is applied to sound data to be transmitted from the first playback device 702*a* to the second playback device 702*b*. In additional or alternate embodiments, spatial processing may be carried out on the data to be transmitted to the second playback device 702*b*, in which case the second spatial processor 766*b* may be bypassed or omitted from the second voice processor 760*b*.

In the scenario depicted in FIG. 7A, a user has spoken a command ("[First wake word], turn on the lights") that includes the first wake word and is intended to invoke the first VAS 790*a*. The microphones 722 detect the sound associated with the command and pass the detected sound to the first voice processor 760*a* for processing by one or more of its components. The first voice processor 760*a* passes the detected sound data from microphones 1-6 to the first wake word engine 770*a*, and passes the detected sound data from microphones 5 and 6 to the first network interface 724*b* for transmission to the second playback device 702*b* via the second network interface 724*b*. The second network interface 724*b* feeds the detected sound data to the second voice processor 760*b*, which may apply one or more voice processing techniques before sending to the second wake word engine 770*b* for detection of the second wake word. Because the command includes the first wake word, the first wake word engine 770*a* triggers the voice extractor (for example, voice extractor 572 in FIG. 5) to stream messages (e.g., messages containing packetized frames of the detected sound to the first VAS 790*a*) via first network interface 724*a*. As the command does not include the second wake word, the second wake word engine 770*b* does not trigger voice extraction to the second VAS 790*b*. The first VAS 790*a* processes the packetized voice data and sends a response to the first network interface 724 with instructions for the first playback device 702*a* to perform the action requested by the user, i.e., to play back music by the Beatles. The first VAS 790*a* may also send the first playback device 702*a* a voice response for playback by the first playback device 702*a* to acknowledge to the user that the MPS 100 and/or first VAS 790*a* has processed the user's request.

Figure 7B:
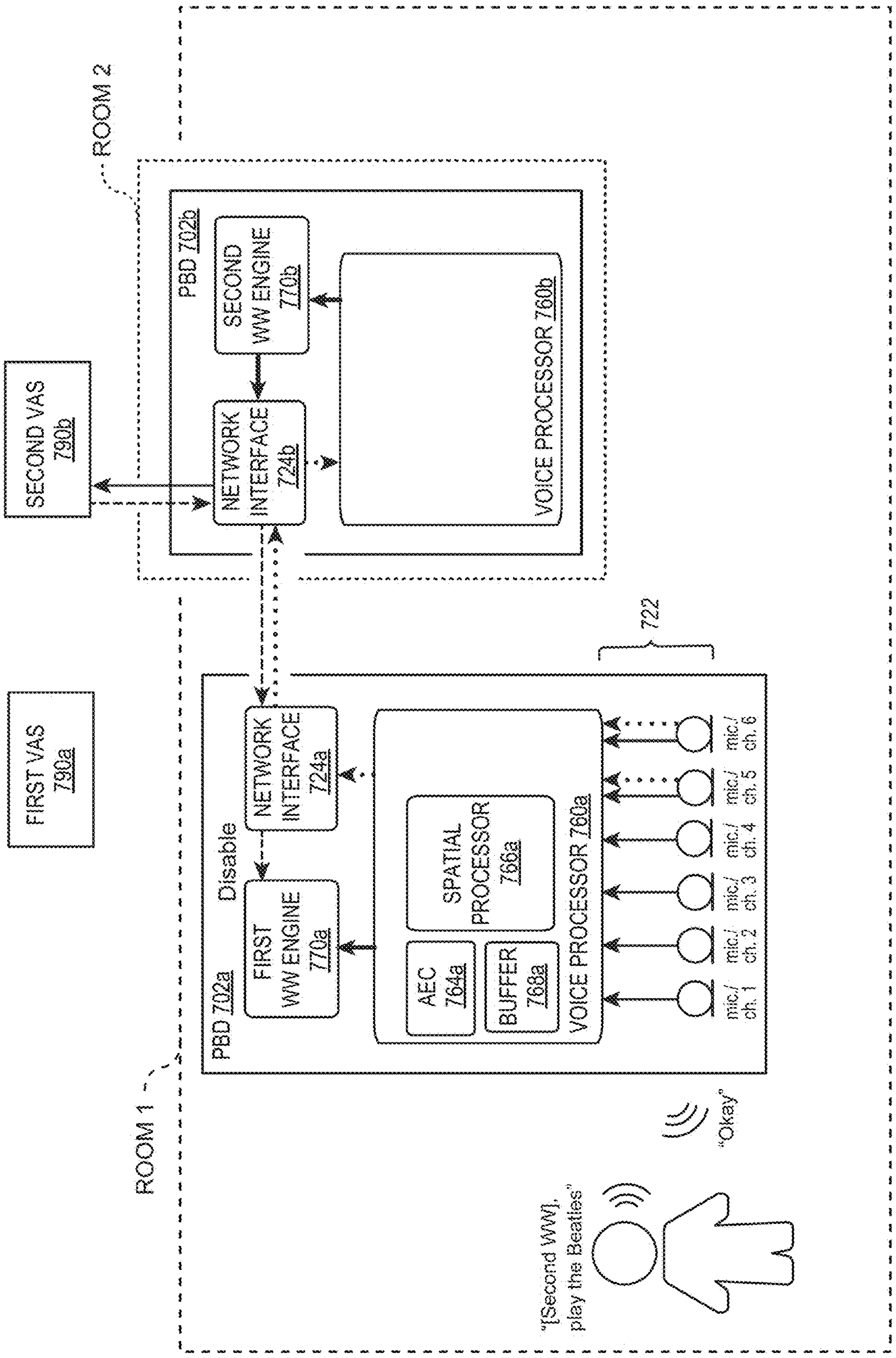
FIG. 7B is an example network configuration in accordance with aspects of the disclosure.

FIG. 7B depicts the first and second playback devices 702*a*, 702*b* within the example environment of FIG. 7A, but in this example the user has spoken a command that includes the second wake word and is intended to invoke the second VAS 790*b*. As shown in FIG. 7B, in such a scenario the second wake word engine 770*b* detects the second wake word in the detected sound and triggers the voice extractor (such as voice extractor 572 in FIG. 5, which may then extract sound data (e.g., packetizing frames of the detected sound into messages). In the example shown in FIG. 7B, the voice extractor extracts sound data to one or more remote computing devices associated with the second VAS 790*b* (e.g., via second network interface 724*b*). The remote computing device(s) associated with the second VAS 790*b* are configured to process the sound data associated with the detected sound and send a response to the second playback device 702*b* (e.g., via the second network interface 724*b*) that may include instructions for the first playback device 702*a*, the second playback device 702*b*, and/or another playback device(s) of the MPS 100 to perform an action or series of actions (or, in some instances, do nothing). For the example command provided in FIG. 7B ("play the Beatles"), the second VAS 790*b* sends a message to the second playback device 702*b* with instructions for the first playback device 702*a* to play music by the Beatles. The second playback device 702*b* may then forward the instructions to the first playback device 702*a*, and the first playback device 702 performs the action. The second VAS 790*b* may also send the second playback device 702*b* a voice response for playback by the first playback device 702*a* to acknowledge to the user that the MPS 100 and/or second VAS 790*b* has processed the user's request. As shown in FIG. 7B, the first playback device 702*a* may then play back the voice response ("okay").

In some embodiments the second VAS 790*b* may be made aware of the first playback device 702*a*, the relationship between the first and second playback devices 702*a*, 702*b*, and/or the functional capabilities and/or limitations of each playback device (i.e., has/does not have a speaker/capable of playback, has/does not have a microphone/is NMD-equipped, etc.), and the response may include a message instructing the second playback device 702*b* to send instructions to the first playback device 702*a* that causes the first playback device 702*a* to do nothing or perform an action. Thus, even though the second playback device 702*b* is the playback device in direct communication with the second VAS 190*b*, in some embodiments the second playback device 702*b* may not take any action other than to instruct the first playback device 702*a* to act.

In some embodiments, the second VAS 790*b* may not receive any information regarding which playback device was the originator of the detected sound and/or which playback device will be performing the action (i.e., the second VAS 790*b* is not aware of the first playback device 702*a*). In such embodiments, the second VAS 790*b* may send a message to the second playback device 702*b* with instructions to do nothing or perform an action, and the second playback device 702*b* may forward the message to the first playback device 702*a*. The second playback device 702*b* may automatically forward the message, or may first process the message to decide whether the message should be transmitted to the first playback device 702*a*.

Figure 7C:
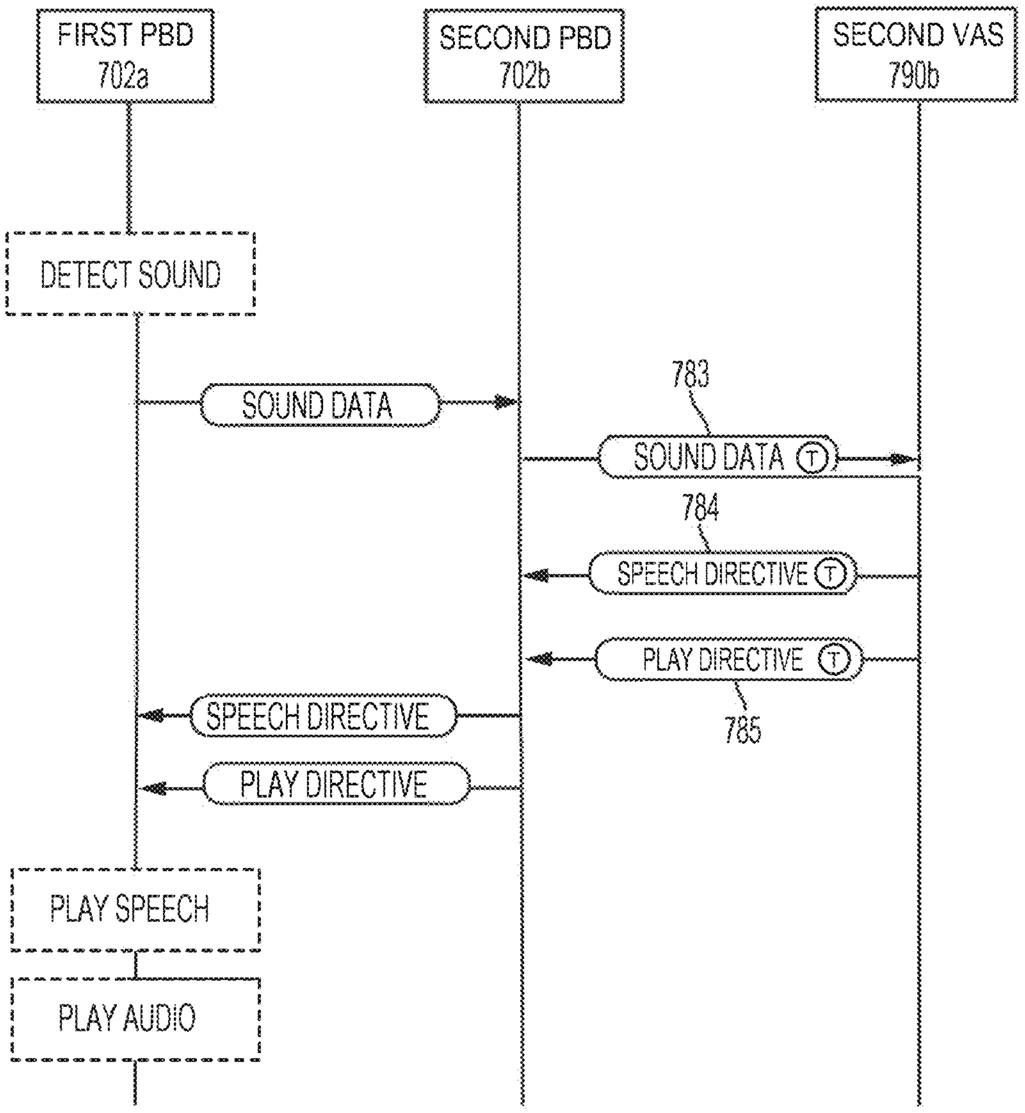
FIG. 7C is an example network configuration in accordance with aspects of the disclosure.

As shown in the example flow diagram of FIG. 7C, the second playback device 702*b* may optionally include an identifier, such as a tag T, in the messages 783 containing the sound data transmitted to the second VAS 790*b* so that, when the second VAS 790*b* sends the response(s) 784, 785 containing the instructions for responding to the user's request, the instructions are identified to the second playback device 702*b* for playback by the first playback device 702*a*. In some embodiments, the tag T is only meaningful to the second playback device 702*b* and the second VAS 790*b* passively includes the tag in the responses without being aware of its function or implication. In other embodiments, the tag T also indicates to the second VAS 790*b* that the first playback device 702*a* will be performing the requested action (or at least that the second playback device 702*b* is not performing the requested action).

Whether to be performed by the first playback device 702*a*, the second playback device 702*b*, or other playback device of the MPS 100, the action may comprise playing back an audio response on the first and/or second playback device 702*a*, 702*b* (and/or other playback device of the MPS 100). For example, the audio response may be an acknowledgment of receipt of the command, such as instructions to play back a chime or a voice response (e.g., an audio file) to play back (such as "okay," etc.). The audio response may additionally or alternately comprise a voice response with an answer to a question asked in the voice input (e.g., "53 degrees and raining" in response to "what is the weather?") or a follow-up request for information ("did you mean the kitchen lights or the patio lights?").

In some embodiments, the second VAS 790*b* may instruct the MPS 100 to download media content (e.g., music, podcasts, audio books, etc.) requested in the voice input to the first and/or second playback device 702*a*, 702*b*. The second VAS 790*b* may provide instructions for the first and/or second VAS 190*b* to perform an action related to media content, such as increasing/decreasing the volume, starting or resuming playback of a media item, playing the next song in the queue, playing the previous song in the queue, stopping or pausing playback, grouping certain playback device(s) of the MPS 100 with other playback device (s) of the MPS 100, transferring playback of a media item to a different playback device, and others.

The action may additionally or alternately include an action that does not directly implicate playback of audio content, such as instructions for the first and/or second playback device 702*a*, 702*b* (or other playback device of the MPS 100) to instruct or otherwise cause a smart home appliance to perform an action (such as instructing a smart light to turn on/off, instructing a smart lock to lock/unlock, etc.). Other non-auditory actions include setting a timer, adding an item to a shopping list, calling one of the user's contacts, etc. For all such non-auditory actions, the second playback device 702*b* may receive instructions to provide an audible acknowledgment (e.g., "okay," a chime, etc.) of the command.

While the second VAS 790*b* is processing the detected sound, the first playback device 702*a* may continue monitoring detected sound for the first wake word and/or transmitting detected sound to the second playback device 702*b*.

Referring again to FIG. 7B, in some embodiments the second playback device 702*b* and/or MPS 100 may temporarily disable (e.g., via a disable signal, as shown) the first wake word engine 770*a* while the second VAS 790*b* processes a voice input in which the second wake word was detected. Disabling the first wake word engine 770*b* may occur regardless of whether the first and second playback devices 702*a*, 702*b* share detected sound from any of the microphones 722 and/or are individually using some or all of the microphones 722. It may be beneficial to disable the first wake word engine 770*a* while the second VAS 790*b* processes a voice input to suppress inadvertent detection of the first wake word and prevent potentially conflicting actions and/or output by the first and/or second playback devices 702*a*, 702*b*. In some embodiments, once the second VAS 790*b* has completed processing of the voice input, the first wake word engine 770*a* may be re-enabled. Likewise, in some embodiments the first playback device 702*a* and/or the MPS 100 may temporarily disable the second wake word engine 770*b* when the first wake word engine 770*a* detects a wake word. Additionally or alternatively, the microphones assigned to the first or second playback device 702*a*, 702*b* may be temporarily disabled when the wake word engine of the other playback device detects its respective wake word. In some embodiments, disabling a wake-word engine may include allowing the wake-word engine to continue to monitor for wake-words but temporarily muting the audio input upstream from the spatial processor, such as by inserting zeroes in a digital input stream or silence at a low noise level such that wake-word is less or not capable of detecting wake-words while muted.

Figure 7D:
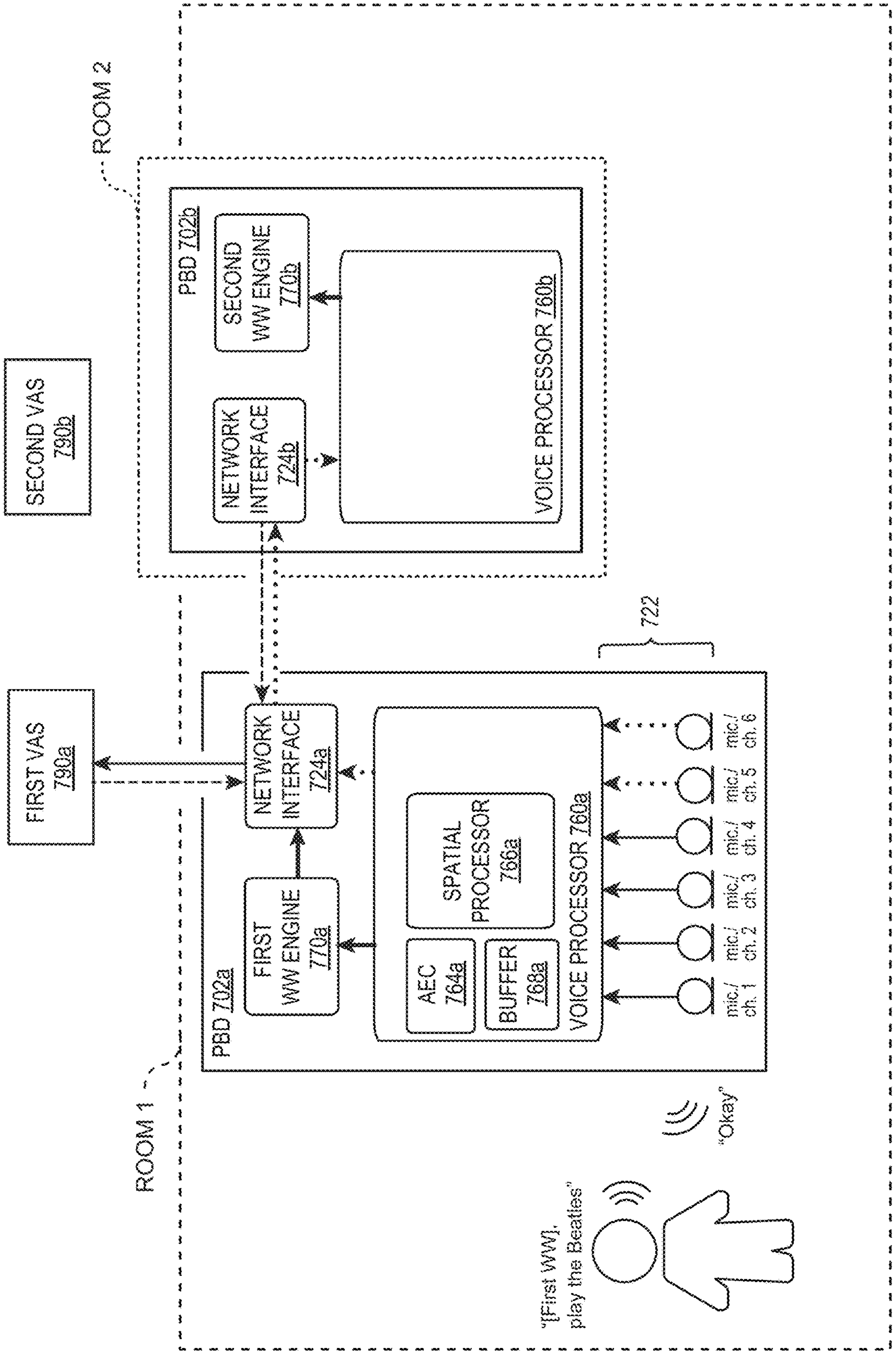
FIG. 7D is an example network configuration in accordance with aspects of the disclosure.

FIG. 7D depicts another configuration of the first and second playback devices 702*a*, 702*b* within the example environment in which the user has spoken the same command as in FIG. 7A that invokes the first VAS 790*a* by using the first wake word. In contrast to the scenario described above with respect to FIG. 7A, the first voice processor 760*a* receives detected sound from a first subset of the microphones 722 (e.g., microphones 1-4), and the second playback device 702*b* receives detected sound from a second subset of the microphones 722 (e.g., microphones 5 and 6) different than the first subset of microphones. In such embodiments, the first and/or second subset of microphones may include any number of microphones less than the total number of microphones of the first playback device 702*a* (including a single microphone). In some aspects, certain ones of the microphones 722 are assigned exclusively to the first playback device 702*a* (for example, by one or both of the playback devices 702, the MPS 100, and/or another playback device of the MPS 100), and certain ones of the microphones 722 are assigned exclusively to the second playback device 702*b*. In such embodiments, the first and second subsets of microphones have no microphones in common. In other embodiments, the first and second subsets of microphones may have at least one microphone in common.

In some embodiments, the MPS 100 and/or the first playback device 702*a* may include a microphone selector (not shown) that dynamically determines which, if any, of the microphones 722 are used for collecting signals for transfer to the second playback device 702*b*. The microphone selector, for example, may utilize a lookback buffer to provide feedback to one or more remote computing devices of the MPS 100 for determining if, when, and/or which of the microphones 722 of the first playback device 702*a* can be shared with or assigned for exclusive use to the second playback device 702*b*. Additional details regarding microphone selection and/or aggregation across multiple playback devices may be found in, for example, in previously referenced U.S. patent application Ser. Nos. 15/989,715; 16/138,111; and Ser. No. 16/141,875.

In these and other implementations, the spatial processor may implement linear filtering or related techniques for selectively disabling/enabling microphones in a way that is not constrained by traditional beamforming techniques. For example, traditional beamforming techniques typically require the number of microphone inputs for a beamformer to be fixed (e.g., to six known microphone channels) because these techniques rely on filtering algorithms that are not adaptive or not readily adaptive to an environment. Linear filtering and related techniques, by contrast, implement algorithms and filtering coefficients that can be adapted on the fly, such that, for example, additional or fewer microphone channels can be selectively routed to the respective voice processors 760*a*, 760*b* depending on the particular ambient noise in an environment, available processing power, etc. Additional examples of spatial processors and/or associated filters, such as multi-channel Wiener filters, for processing speech, reverberated speech, and noise signals, s(t), x(t), v(t), may be found in, for example, in previously referenced U.S. patent application Ser. No. 15/984,073 and U.S. patent Ser. No. 16/147,710, filed Sep. 29, 2018, titled "Linear Filtering for Noise-Suppressed Speech Detection Via Multiple Network Microphone Devices," both of which are incorporated by reference herein in their entireties.

Figure 7E:
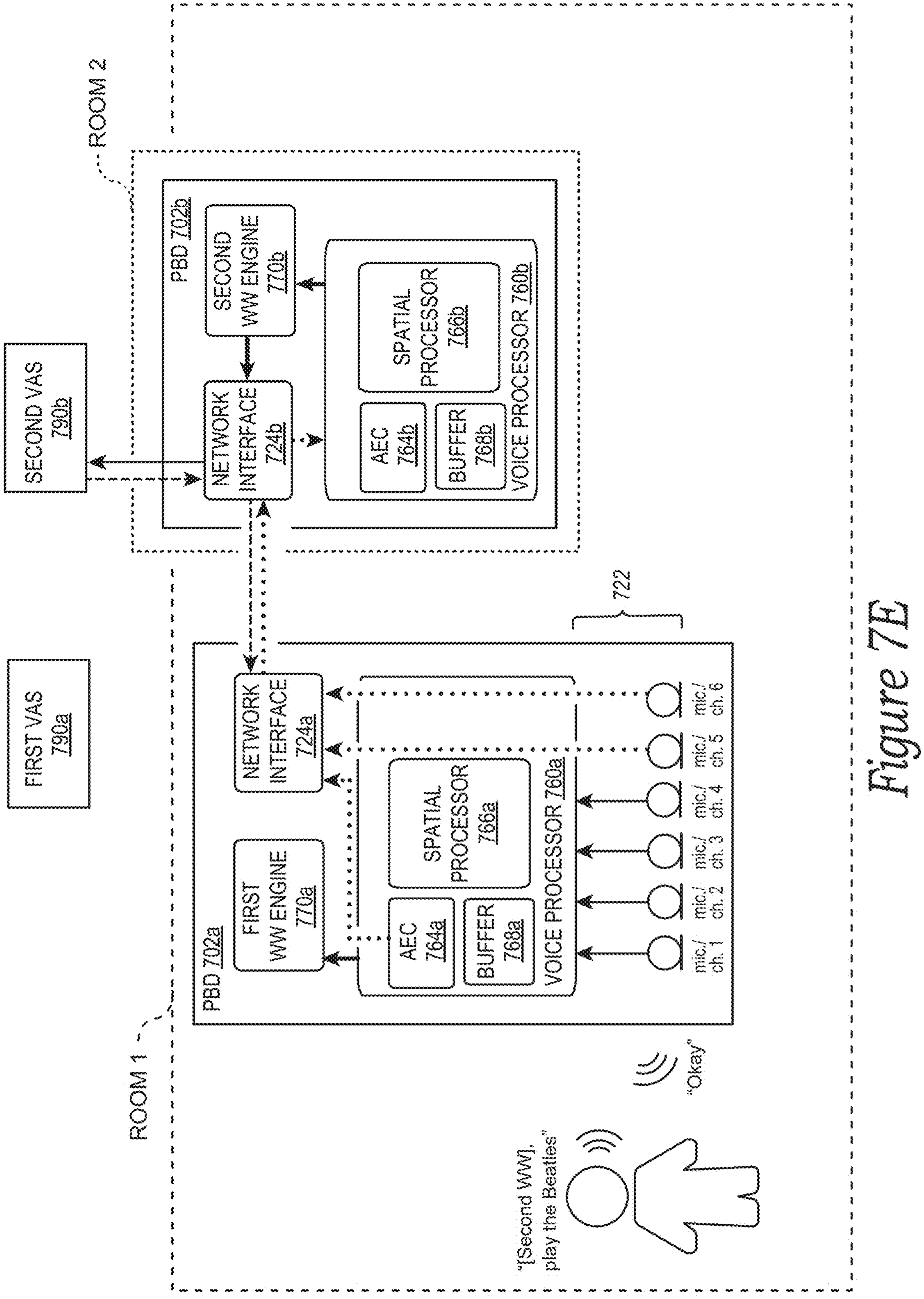
FIG. 7E is an example network configuration in accordance with aspects of the disclosure.

FIG. 7E depicts another configuration of the first and second playback devices 702*a*, 702*b* within the example environment in which the user has spoken the same command as in FIG. 7B that invokes the second VAS 790*b* by using the second wake word. However, in FIG. 7E, the first playback device 702*a* sends the second playback device 702*b* reference data from the first AEC 764*a*, (represented by arrow I(f)) as well as the raw mic data from designated ones of the microphones (e.g., microphones 5 and 6, represented by arrows (I(g) and I(h)). In such embodiments, the second voice processor 760*b* may include a second AEC 764*b* and a second spatial processor 766*b* in addition to the second buffer 768*b*. The second AEC 764*b* and the second spatial processor 766*b* may have generally similar components and functions to respective first AEC 764*a* and first spatial processor 766*a*. The second voice processor 766*b* may be configured to receive and process the reference data and detected sound data before sending the detected sound data to the second wake word engine 770*b* for detection of the second wake word.

Figure 8:
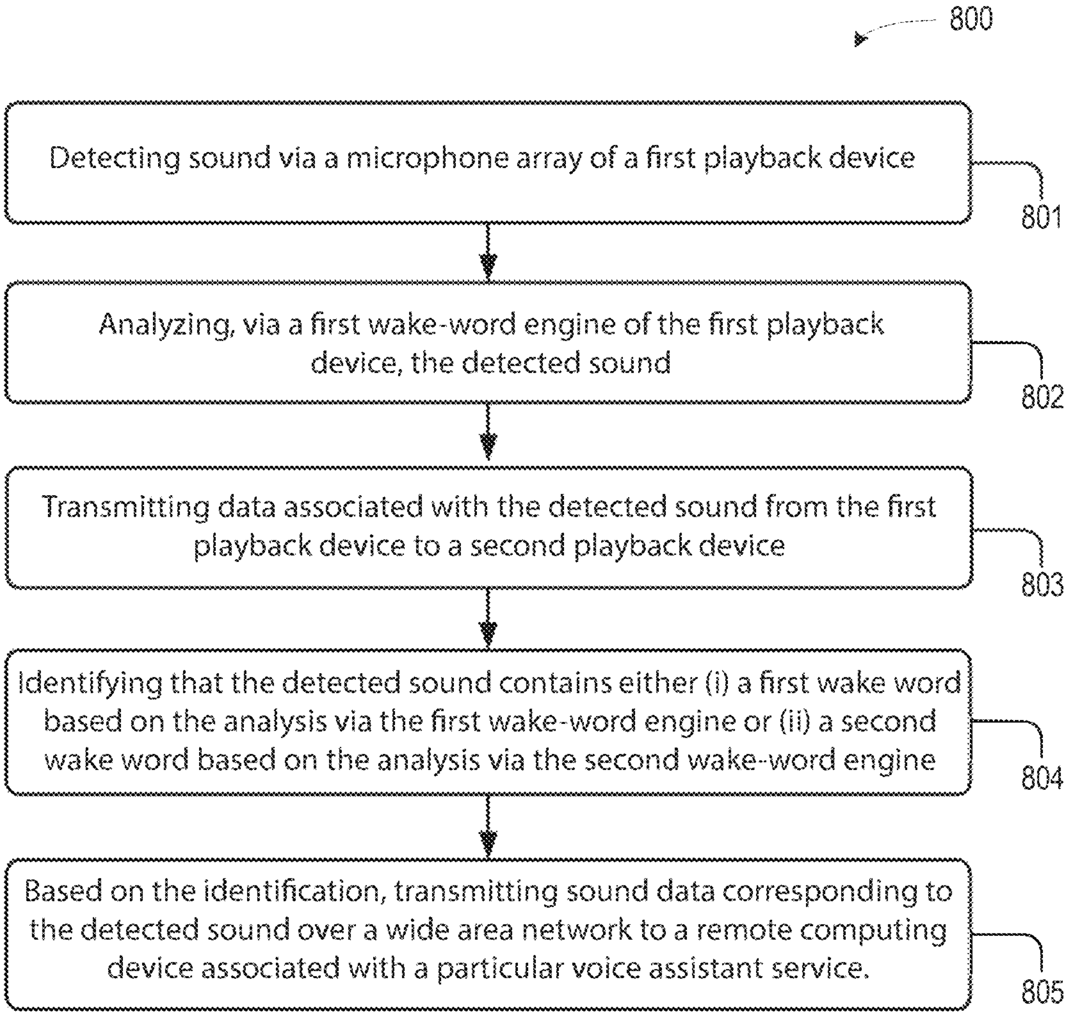
FIG. 8 is an example method in accordance with aspects of the disclosure.
Figure 9:
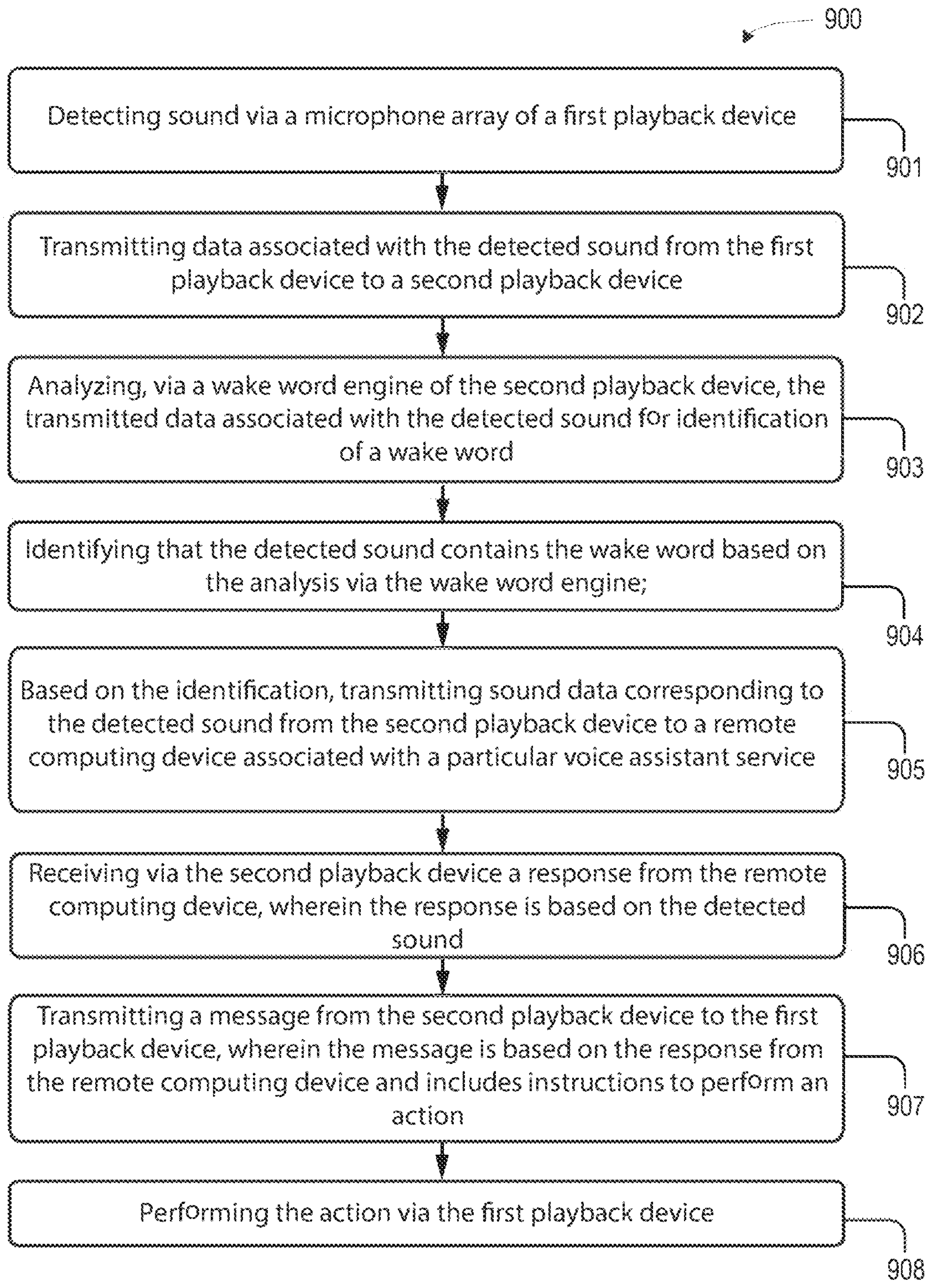
FIG. 9 is an example method in accordance with aspects of the disclosure.

FIGS. 8 and 9 show, respectively, methods 800 and 900 in accordance with embodiments of the present technology that can be implemented by a network microphone device, such as any of the PBDs (such as first and second PBD's 702*a* and 702*b*), NMDs, and/or controller devices disclosed and/or described herein, or any other voice-enabled device now known or later developed.

Referring to FIG. 8, method 800 begins at block 801, which includes detecting sound via a microphone array of a first playback device. Next, the method 800 advances to block 802, which includes analyzing, via a first wake-word engine of the first playback device, the detected sound from the first playback device. At block 803, the method 800 includes transmitting data associated with the detected sound to a second playback device. In some example implementations, the second playback device is a local area network. At block 804, the method 800 includes identifying that the detected sound contains either (i) a first wake word based on the analysis via the first wake-word engine or (ii) a second wake word based on the analysis via the second wake-word engine. Based on the identification, at block 805, the method 800 includes transmitting sound data corresponding to the detected sound over a wide area network to a remote computing device associated with a particular voice assistant service.

Turning to FIG. 9, method 900 begins at block 901, which includes detecting sound via a microphone array of a first playback device (such as PBD 702*a*). At block 902, method 900 includes transmitting data associated with the detected sound from the first playback device to a second playback device (such as PBD 702*b*). In some aspects, the data is transmitted over a local area network. Method 900 further includes analyzing, via a wake word engine of the second playback device, the transmitted data associated with the detected sound for identification of a wake word, as shown at block 903. Method 900 continues at block 904 with identifying that the detected sound contains the wake word based on the analysis via the wake word engine. Based on the identification, transmitting sound data corresponding to the detected sound from the second playback device to a remote computing device over a wide area network (block 905), where the remote computing device is associated with a particular voice assistant service. The method advances at block 906, which includes receiving, via the second playback device, a response from the remote computing device, where the response is based on the detected sound. At block 907, method 900 includes transmitting a message from the second playback device to the first playback device, where the message is based on the response from the remote computing device and includes instructions for the first playback device to perform an action. In some embodiments, the message is transmitted over a local area network. Method 900 further includes performing the action via the first playback device, as shown at block 908.

Figure 10A:
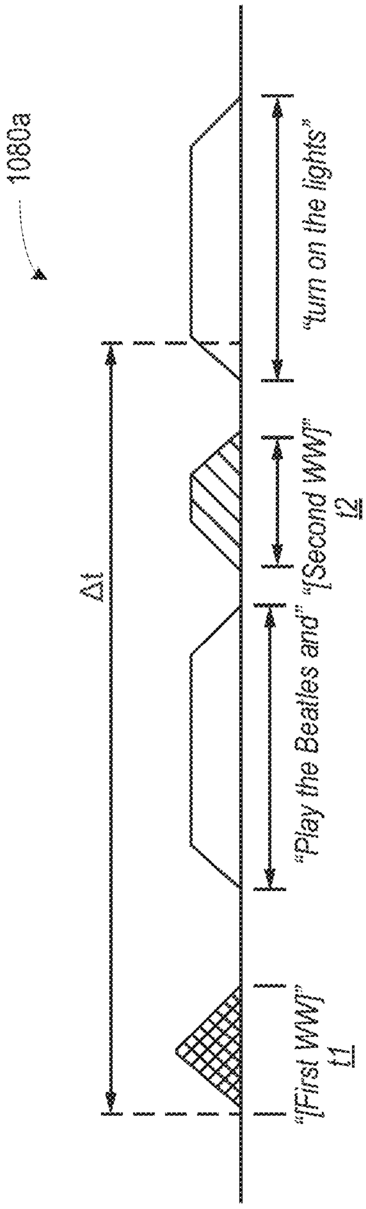
FIGS. 10A and 10B are timelines of example voice inputs.
Figure 10B:
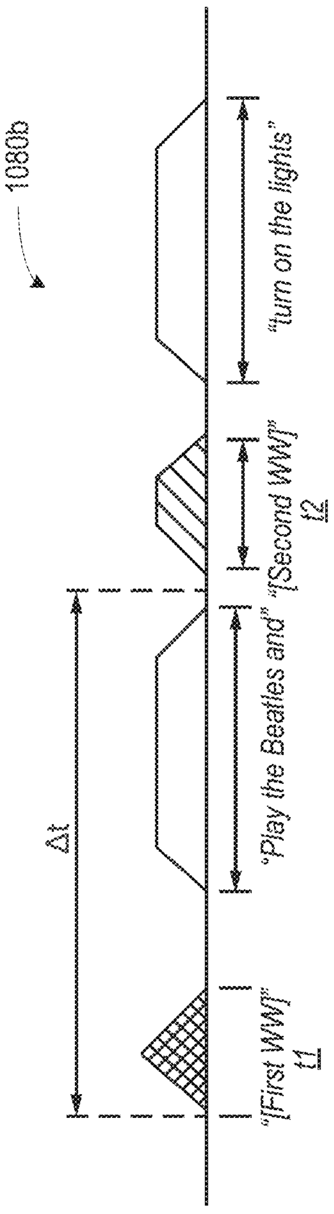

FIGS. 10A and 10B depict example timelines for voice inputs 1080*a* and 1080*b*, respectively, in both of which the user makes two requests, each utilizing a different one of the first and second wake words and intended to invoke a different one of the first and second VASes 702*a*, 702*b* (e.g., "[First wake word], play the Beatles and [second wake word], turn on the lights"). For each of the voice inputs 1080*a* and 1080*b*, the user speaks the first wake word at a first time $t_1$ and speaks the second wake word at a second time $t_2$. In some embodiments, the MPS 100 may only allow concurrent voice processing if the voice input and/or the detected wake words fall within a predetermined time interval Δt. If both of the first and second wake words are detected within the time interval Δt (as is the case in FIG. 10A), then concurrent processing of the associated voice input by the first and second VASes 790*a* and 790*b* is allowed to proceed. If the first and second wake words are detected outside of the time interval Δt (as is the case in FIG. 10B) then concurrent voice processing is not allowed to proceed and one or both of the first and second playback devices 702*a*, 702*b* (or voice processing functions thereof) are temporarily disabled. For example, in FIG. 10B, the second wake word falls outside of the time interval Δt, and thus only the first playback device 702*a* is allowed to proceed with contacting the first VAS 790*a* while the second playback device 702*b* is disabled or otherwise prevented from communicating with the second VAS 790.

When voice processing is allowed to proceed, each of the first and second VASes 790*a* and 790*b* may send a response to the corresponding first and second playback devices 702*a* and 702*b*, which may include instructions to perform an action or to do nothing. The responses from the first and second VASes 790*a* and 790*b* may be transmitted at the same time or at different times, and may or may not be in the same order as the corresponding wake word detection. Likewise, performance of the action (if applicable) by the corresponding playback device may occur at the same time or at different times, and may or may not be in the same order as the corresponding wake word detection and/or receipt of response.

Whether performance of the actions by the first and second playback devices 702*a*, 702*b* occurs at least partially at the same time may depend on the nature of the actions to be performed. For example, in the illustrated embodiment, the action for the first playback device 702*a* is to output the requested media content, while the action for the second playback device 702*b* is to cause the smart lights to turn on. Turning on the lights does not require output of audio content by the second playback device 802*b*, and thus the second playback device 702*b* may perform the action without interfering with the output of the media content by the first playback device 702*a*. However, if the action does require playback of audio content (for example, the second playback device 702*b* may output a voice response of "okay" to acknowledge that the voice input has been processed), the first and second playback devices 702*a*, 702*b* may coordinate output of their respective audio contents.

Figure 11:
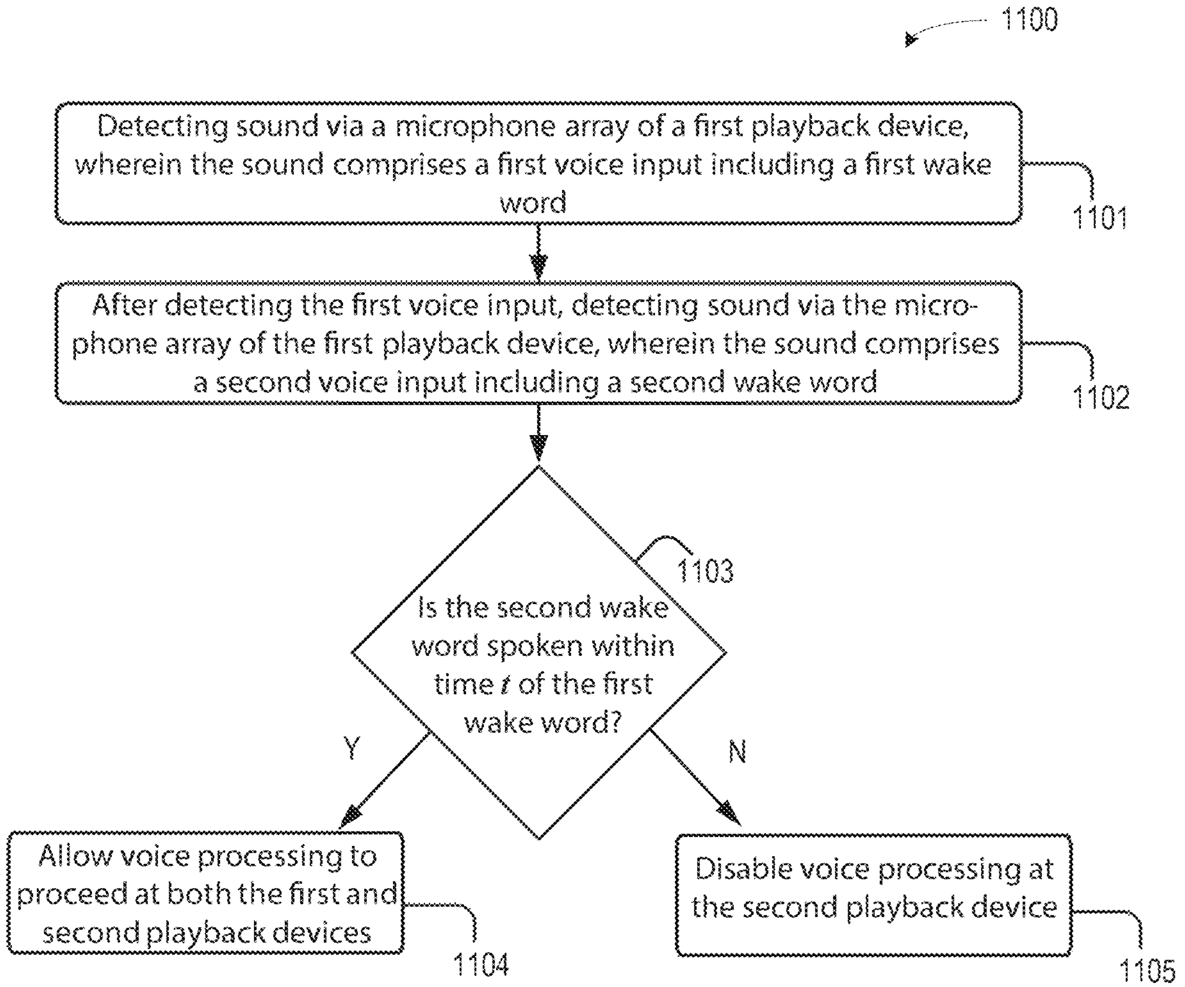
FIG. 11 is an example method in accordance with aspects of the disclosure.

FIG. 11 shows a method 1100 in accordance with embodiments of the present technology that can be implemented by a network microphone device, such as any of the PBDs (such as first and second PBD's 702*a* and 702*b*), NMDs, and/or controller devices disclosed and/or described herein, or any other voice-enabled device now known or later developed. Method 1100 begins at block 1101, which includes detecting sound via a microphone array of a first playback device (such as first playback device 702*a*). The sound may comprise a first voice input including a first wake word. At block 1102, the method 1100 includes detecting sound via the microphone array of the first playback device, wherein the sound comprises a second voice input including a second wake word. As indicated at blocks 1103-1105: (a) if the second wake word is detected within a predetermined time interval t of detection of the first wake word, then voice processing is allowed to process with both the first and second playback devices; (b) if the second wake word is not detected within a predetermined time interval t of detection of the first wake word, then voice processing is disabled at the second playback device (or whichever device is associated with the wake word uttered second.)

Various embodiments of methods 800, 900, and 1100 include one or more operations, functions, and actions illustrated by blocks 801-805, 901-908, and 1101-1105, respectively. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the methods of 800, 900, and 1100 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

Figure 12:
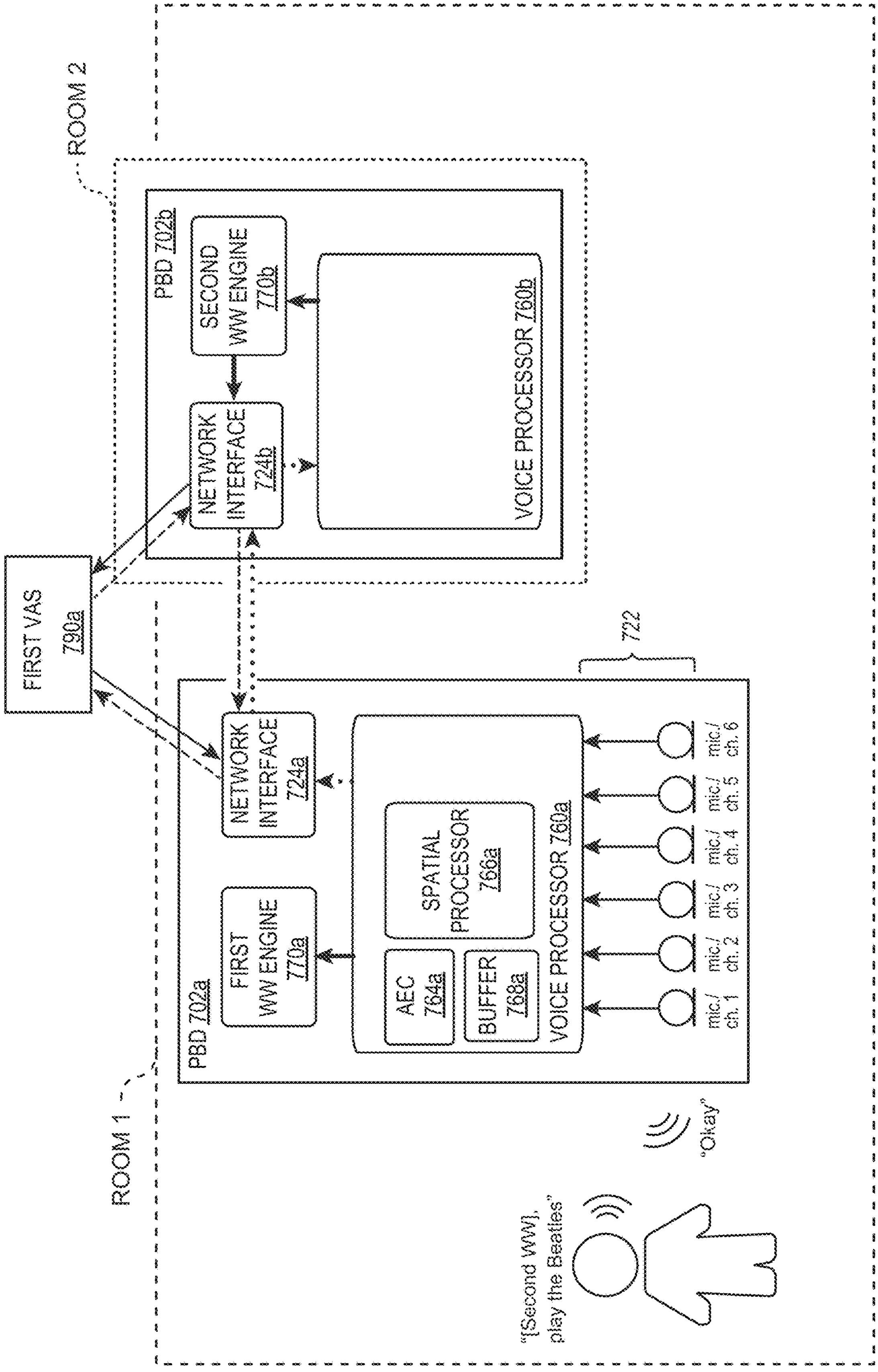
FIG. 12 is an example network configuration in accordance with aspects of the disclosure.

FIG. 12 depicts another configuration of the first and second playback devices 702*a* and 702*b* within the example environment, except in FIG. 12 the first and second wake word engines 770*a* and 770*b* are associated with a common VAS (such as first VAS 790*a*) even though the first and second wake word engines 770*a* and 770*b* are configured to detect different wake words. For example, the first wake word engine 770*a* may be configured to run a wake word detection algorithm for a wake word spoken with a Spanish accent, while the second wake word engine 770*b* may be configured to run a wake word detection algorithm for the same wake word but spoken with a French accent. In the foregoing example, both the first and second wake word engines 770*a* and 770*b* may be associated with the same VAS. In another aspect of the technology, the first wake word engine 770*a* may be configured to detect a first wake word associated with the VAS 990 (such as the first wake word) while the second wake word engine 970*b* may be configured to detect a wake word associated with the MPS 100 (e.g., "Hey Sonos").

In addition or alternatively, the second wake-word engine 770*b* may be configured to detect sounds in addition to or in lieu of wake words in the voice stream received from the first playback device 702*a* over the network interface 724. For example, the second wake-word engine 770*b* may be configured to run a local NLU engine to detect certain playback control commands, such as volume, grouping, playback/transport control, etc. In these and other embodiments, the second wake-word engine 770*b* can be configured to run other algorithms for event detection, such as listening for window breaks, fire alarms, breach of security events, etc. In some embodiments, the first playback device 702*a* may have limited processing resources (e.g., available system memory, power constraints, etc.) relative to the second playback device 702*b*. As such, a playback device without sufficient resources to run microphone DSP, a wake-word engine, and an additional NLU/event-detection engine may offload NLU/event-detection engine to another playback device. As an example, the first playback device 702*a* may be a portable playback device, such as set of wireless headphones. In related embodiments, the second wake-word engine 770*b* may be able to detect wake-words more accurately than the first wake-word engine 770*a*. In such instances, the second wake-word engine 770*b* may intervene if the first wake-word engine 770*a* failed to detect a certain wake-word and/or if the first wake-word engine 770*a* was triggered by a wake word that the second wake-word engine 770*b* determined to be a false positive.

Although the foregoing systems and methods for distributed wake word processing are described with respect to a configuration in which the second playback device 702*b* does not have any microphones, it will be appreciated that the systems and methods described herein may also be carried out using a second playback device 702*b* with onboard microphones. In such embodiments, the second playback device 702*b* may still receive and/or process transmitted data related to sound detected by one, some, or all of the microphones 722 of the first playback device 702*a*, which may be in addition to or in lieu of sound detected by its own microphones. In some embodiments, the second voice processor 760*b* receives and/or processes sound data from one, some, or all of the first microphones 722*a* and one, some, or all of the second microphones. The second playback device 702*b* may have the same or a different number and/or configuration of microphones as the first playback device 702*a*. The second voice processor 760*b* may still receive and/or process data related to the sound detected by the first microphones 722*a* even when the second playback device 702*b* is in the same room as the first playback device 702*a* or otherwise detecting sound generated by at least one of the same sources via its own microphones 722*b*.

In some aspects of the technology, one, some, or all of the microphones of the second playback device 702*b* may be functionally disabled (for example, by one or both of the playback devices 702, the MPS 100, and/or another playback device of the MPS 100). One or more of the second microphones may be functionally disabled, for example, in response to the second voice processor 760*b* receiving data related to the sound from the microphones 722 of the first playback device 702*a*.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method comprising: detecting sound via a microphone array of a first playback device and analyzing, via a first wake-word engine of the first playback device, the detected sound; transmitting data associated with the detected sound from the first playback device to a second playback device over a local area network; analyzing, via a second wake-word engine of the second playback device, the transmitted data associated with the detected sound; identifying that the detected sound contains either (i) a first wake word based on the analysis via the first wake-word engine or (ii) a second wake word based on the analysis via the second wake-word engine; and based on the identification, transmitting sound data corresponding to the detected sound over a wide area network to a remote computing device associated with a particular voice assistant service. Example 2: The method of Example 1, wherein the sound data further contains a voice utterance and the method further comprises receiving, via one of the first playback device and the second playback device, at least one message from the remote computing device, where the message includes a playback command based on the voice utterance. The method may further include playing back, via at least one of the first playback device and the second playback device, audio content based on the playback command. Example 3: The method of Example 1 or Example 2, wherein the identifying comprises identifying the second wake word (i) based on the transmitted data associated with the detected sound and (ii) without detecting the sound via the second playback device. Example 4: The method of any one of Examples 1 to 3, wherein the microphone array comprises a plurality of individual microphones and the first playback device comprises a voice processor configured to receive portions of the detected sound from respective ones of the individual microphones. In such embodiments, the method may comprise processing, via the voice processor, one or more of the portions of the detected sound to produce the data associated with the detected sound that is transmitted to the second playback device. Example 5: The method of any one of Examples 1 to 4, further comprising processing the one or more portions of the detected sound comprises processing fewer than all of the portions of the detected sound. Example 6: The method of any one of Examples 1 to 5, further comprising spatially processing, via the voice processor, the detected sound based on one or more of the portions of the detected sound. In such embodiments, analyzing the detected sound via the first wake-word engine comprises analyzing the spatially processed detected sound. Example 7: The method of any one of Examples 1 to 6, further comprising (a) playing back, via the first playback device, audio content; and (b) producing, via the first playback device, at least one reference signal based on the audio content, where the data associated with the detected sound that is transmitted to the second playback device comprises data that is based on the at least one reference signal.

Example 8: A system comprising a first playback device and a second playback device. The first playback device may comprise one or more processors, a microphone array, and a first computer-readable medium storing instructions that, when executed by the one or more processors, cause the first device to perform first operations, the first operations comprising: detecting sound via the microphone array; analyzing, via a first wake-word engine of the first playback device, the detected sound; and transmitting data associated with the detected sound from the first playback device to a second playback device over a local area network. The second playback device may comprise one or more processors and a second computer-readable medium storing instructions that, when executed by the one or more processors, cause the second device to perform second operations, the second operations comprising: analyzing, via a second wake-word engine of the second playback device, the transmitted data associated with the detected sound; identifying that the detected sound contains a second wake word based on the analysis via the second wake-word engine; and based on the identification, transmitting sound data corresponding to the detected sound over a wide area network to a remote computing device associated with a particular voice assistant service. Example 9: the system of Example 8, wherein the sound data further contains a voice utterance and the second operations further comprise receiving at least one message from the remote computing device. The message may comprise a playback command that is based on the voice utterance. In such embodiments, the first operations may further comprise playing back audio content based on the playback command. Example 10: the system of Example 8 or Example 9, wherein identifying the second wake word is (i) based on the transmitted data associated with the detected sound and (ii) without detecting the sound via the second playback device. Example 11: the system of any one of Examples 8 to 10, wherein the microphone array comprises a plurality of individual microphones and the first playback device comprises a voice processor configured to receive portions of the detected sound from respective ones of the individual microphones. In such operations, the first operations may comprise processing, via the voice processor, one or more of the portions of the detected sound to produce the data associated with the detected sound that is transmitted to the second playback device. Example 12: the system of any one of Examples 8 to 11, wherein processing the one or more portions of the detected sound comprises processing fewer than all of the portions of the detected sound. Example 13: the system of any one of Examples 8 to 12, wherein the first operations further comprise spatially processing, via the voice processor, the detected sound based on one or more of the portions of the detected sound. In such embodiments, analyzing the detected sound via the first wake-word engine comprises analyzing the spatially processed detected sound. Example 14: the system of any one of Examples 8 to 13, wherein the first operations further comprise playing back, via the first playback device, audio content, and producing, via the first playback device, at least one reference signal based on the audio content. In such embodiments, the data associated with the detected sound that is transmitted to the second playback device comprises data that is based on the at least one reference signal.

Example 15: A plurality of non-transitory computer-readable media storing instructions for distributed wake-word detection, including a first computer-readable storage medium and a second computer-readable storage medium. The first computer-readable medium may store instructions that, when executed by one or more processors, cause the one or more processors to perform first operations. The first operations may comprise detecting sound via the microphone array; analyzing, via a first wake-word engine of the first playback device, the detected sound; and transmitting data associated with the detected sound from the first playback device to a second playback device over a local area network. The second computer-readable medium may store instructions that, when executed by one or more processors, cause the one or more processors to perform second operations. The second operations may comprise: analyzing, via a second wake-word engine of the second playback device, the transmitted data associated with the detected sound; identifying that the detected sound contains a second wake word based on the analysis via the second wake-word engine; and based on the identification, transmitting sound data corresponding to the detected sound over a wide area network to a remote computing device associated with a particular voice assistant service. Example 16: the plurality of non-transitory computer-readable media of Example 15, wherein the sound data further contains a voice utterance, and wherein (a) the second operations further comprise receiving at least one message from the remote computing device, wherein the message comprises a playback command, and wherein the playback command is based on the voice utterance; and (b) the first operations further comprise playing back audio content based on the playback command. Example 17: the plurality of non-transitory computer-readable media of Example 15 or Example 16, wherein identifying the second wake word is (i) based on the transmitted data associated with the detected sound and (ii) without detecting the sound via the second playback device. Example 18: the plurality of non-transitory computer-readable media of any one of Examples 15 to 17, wherein the microphone array comprises a plurality of individual microphones, the first playback device comprises a voice processor configured to receive portions of the detected sound from respective ones of the individual microphones, and the first operations comprise processing, via the voice processor, one or more of the portions of the detected sound to produce the data associated with the detected sound that is transmitted to the second playback device. Example 19: the plurality of non-transitory computer-readable media of any one of Examples 15 to 18, wherein processing the one or more portions of the detected sound comprises processing fewer than all of the portions of the detected sound. Example 20: the plurality of non-transitory computer-readable media of any one of Examples 15 to 19, wherein the first operations may further comprise spatially processing, via the voice processor, the detected sound based on one or more of the portions of the detected sound, and wherein analyzing the detected sound via the first wake-word engine comprises analyzing the spatially processed detected sound.

Example 21: A method comprising: detecting sound via a microphone array of a first playback device; transmitting data associated with the detected sound from the first playback device to a second playback device over a local area network; analyzing, via a wake word engine of the second playback device, the transmitted data associated with the detected sound for identification of a wake word; identifying that the detected sound contains the wake word based on the analysis via the wake word engine; based on the identification, transmitting sound data corresponding to the detected sound from the second playback device to a remote computing device over a wide area network, wherein the remote computing device is associated with a particular voice assistant service; receiving via the second playback device a response from the remote computing device, wherein the response is based on the detected sound; transmitting a message from the second playback device to the first playback device over the local area network, wherein the message is based on the response from the remote computing device and includes instructions to perform an action; and performing the action via the first playback device. Example 22: the method of Example 21, wherein the action is a first action and the method further comprises performing a second action via the second playback device, where the second action is based on the response from the remote computing device. Example 23: the method of Example 21 or Example 22, further comprising disabling a wake word engine of the first playback device in response to the identification of the wake word via the wake word engine of the second playback device. Example 24: the method of any one of Examples 21 to 23, further comprising enabling a wake word engine of the first playback device after the second playback device receives the response from the remote computing device. Example 25: the method of Example 24, wherein the wake word may be a second wake word, and the wake word engine of the first playback device is configured to detect a first wake word that is different than the second wake word. Example 26: the method of any one of Examples 21 to 25, wherein the first playback device is configured to communicate with the remote computing device associated with the particular voice assistant service. Example 27: the method of any one of Examples 21 to 26, wherein the remote computing device is a first remote computing device and the voice assistant service is a first voice assistant service, and the first playback device is configured to detect a wake word associated with a second voice assistant service different than the first voice assistant service.

Example 28: A first playback device comprising one or more processors and a computer-readable medium storing instructions that, when executed by the one or more processors, cause the first playback device to perform operations. The operations may comprise receiving, from a second playback device over a local area network, data associated with sound detected via a microphone array of the second playback device; analyzing, via a wake word engine of the first playback device, the data associated with the detected sound for identification of a wake word; identifying that the detected sound contains the wake word based on the analysis via the wake word engine; based on the identification, transmitting sound data corresponding to the detected sound to a remote computing device over a wide area network, wherein the remote computing device is associated with a particular voice assistant service; receiving a response from the remote computing device, wherein the response is based on the detected sound; and transmitting a message to the second playback device over the local area network, wherein the message is based on the response from the remote computing device and includes instructions for the second playback device to perform an action. Example 29: the first playback device of Example 28, wherein the action is a first action and the operations further comprise performing a second action via the first playback device, where the second action is based on the response from the remote computing device. Example 30: the first playback device of Example 28 or Example 29, wherein the operations may comprise disabling a wake word engine of the second playback device in response to the identification of the wake word via the wake word engine of the first playback device. Example 31: the first playback device of any one of Examples 28 to 30, wherein the operations of the first playback device may comprise enabling the wake word engine of the second playback device after the first playback device receives the response from the remote computing device. Example 32: the first playback device of any one of Examples 28 to 31, wherein the wake word is a first wake word and the wake word engine of the second playback device is configured to detect a second wake word that is different than the first wake word. Example 33: the first playback device of any one of Examples 27 to 32, wherein the first playback device is configured to communicate with the remote computing device associated with the particular voice assistant service. Example 34: the first playback device of any one of Examples 28 to 33, wherein the remote computing device is a first remote computing device and the voice assistant service is a first voice assistant service. In such embodiments, the second playback device may be configured to detect a wake word associated with a second voice assistant service different than the first voice assistant service.

Example 35: A system comprising a first playback device and a second playback device. The first playback device may comprise one or more processors, a microphone array, and a first computer-readable medium storing instructions that, when executed by the one or more processors, cause the first playback device to perform first operations. The first operations may comprise: detecting sound via the microphone array; transmitting data associated with the detected sound to a second playback device over a local area network. The second playback device may comprise one or more processors and a second computer-readable medium storing instructions that, when executed by the one or more processors, cause the second playback device to perform second operations. The second operations may comprise analyzing, via a wake word engine of the second playback device, the transmitted data associated with the detected sound from the first playback device for identification of a wake word; identifying that the detected sound contains the wake word based on the analysis via the wake word engine; based on the identification, transmitting sound data corresponding to the detected sound to a remote computing device over a wide area network, wherein the remote computing device is associated with a particular voice assistant service; receiving a response from the remote computing device, wherein the response is based on the detected sound; and transmitting a message to the first playback device over the local area network, wherein the message is based on the response from the remote computing device and includes instructions to perform an action. The first computer-readable medium of the first playback device may cause the first playback device to perform the action from the instructions received from the second playback device. Example 36: the system of Example 35, wherein the action is a first action and the second operations further comprise performing a second action via the second playback device, where the second action is based on the response from the remote computing device. Example 37: the system of Example 35 or Example 36, wherein the second operations may further comprise disabling a wake word engine of the first playback device in response to the identification of the wake word via the wake word engine of the second playback device. Example 38: the system of any one of Examples 35 to 37, wherein the second operations may further comprise enabling the wake word engine of the first playback device after the second playback device receives the response from the remote computing device. Example 39: the system of any one of Examples 35 to 38, wherein the first playback device may be configured to communicate with the remote computing device associated with the particular voice assistant service. Example 40: the system of any one of Examples 35 to 39, wherein the remote computing device is a first remote computing device and the voice assistant service is a first voice assistant service, and wherein the first playback device is configured to detect a wake word associated with a second voice assistant service different than the first voice assistant service.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

In addition to the examples described herein with respect to grouping and bonding playback devices, in some implementations multiple playback devices may be merged together. For example, a first playback device may be merged with a second playback device to form a single merged "device." The merged playback devices and may not be specifically assigned different playback responsibilities. That is, the merged playback devices and may, aside from playing audio content in synchrony, each play audio content as they would if they were not merged. However, the merged devices may present to the media playback system and/or to the user as a single user interface (UI) entity for control.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device comprising:

one or more processors;

one or more microphones;

a network interface; and data storage storing instructions that, when executed by the one or more processors, cause the playback device to perform operations comprising:

detecting, via the one or more microphones, a first voice input comprising a first wake word at a first time;

detecting, via the one or more microphones, a second voice input comprising a second wake word at a second time;

determining whether a time interval between the first time and the second time is less than a predetermined threshold;

when the time interval is less than the predetermined threshold:

enabling concurrent processing of both the first voice input and the second voice input;

transmitting data corresponding to the first voice input to a first voice assistant service; and transmitting data corresponding to the second voice input to a second playback device over a local area network via the network interface.

2. The playback device of claim 1, wherein the operations further comprise:

when the time interval exceeds the predetermined threshold, forgoing transmitting data corresponding to the second voice input to the second playback device.

3. The playback device of claim 1, wherein the operations further comprise, responsive to enabling concurrent processing of both the first voice input and second voice input, receiving a first response from the first voice assistant service and a second response from a second voice assistant service, wherein at least one of the first response or the second response comprises instructions to perform a playback action.

4. The playback device of claim 1, wherein:

the first wake word is associated with the first voice assistant service;

the second wake word is associated with the second voice assistant service different from the first voice assistant service; and the first voice assistant service and second voice assistant service are configured to process voice inputs concurrently.

5. The playback device of claim 1, wherein detecting the first voice input comprises:

obtaining sound data corresponding to the detected first voice input;

analyzing the sound data via a first wake word engine to detect the first wake word; and analyzing the sound data via a second wake word engine to detect the second wake word, wherein the first wake word engine and second wake word engine operate concurrently.

6. The playback device of claim 1, wherein the operations further comprise:

after enabling concurrent processing, receiving respective responses from the first voice assistant service and a second voice assistant service; and coordinating performance of actions specified in the respective responses by determining whether the actions can be performed simultaneously without interference.

7. The playback device of claim 6, wherein coordinating performance of the actions comprises:

determining that a first action comprises audio playback and a second action does not comprise audio playback; and performing the first action and second action concurrently based on determining that the second action will not interfere with the audio playback of the first action.

8. A method comprising:

detecting, via one or more microphones of a playback device, a first voice input comprising a first wake word at a first time;

detecting, via the one or more microphones, a second voice input comprising a second wake word at a second time;

determining whether a time interval between the first time and the second time is less than a predetermined threshold;

when the time interval is less than the predetermined threshold:

enabling concurrent processing of both the first voice input and the second voice input;

transmitting data corresponding to the first voice input to a first voice assistant service; and transmitting data corresponding to the second voice input to a second playback device over a local area network.

9. The method of claim 8, further comprising, when the time interval exceeds the predetermined threshold, forgoing transmitting data corresponding to the second voice input to the second playback device.

10. The method of claim 8, further comprising, responsive to enabling concurrent processing of both the first voice input and second voice input, receiving a first response from the first voice assistant service and a second response from a second voice assistant service, wherein at least one of the first response or the second response comprises instructions to perform a playback action.

11. The method of claim 8, wherein:

the first wake word is associated with the first voice assistant service;

the second wake word is associated with a second voice assistant service different from the first voice assistant service; and the first voice assistant service and second voice assistant service are configured to process voice inputs concurrently.

12. The method of claim 8, wherein detecting the first voice input comprises:

obtaining sound data corresponding to the detected first voice input;

analyzing the sound data via a first wake word engine to detect the first wake word; and analyzing the sound data via a second wake word engine to detect the second wake word, wherein the first wake word engine and second wake word engine operate concurrently.

13. The method of claim 8, further comprising:

after enabling concurrent processing, receiving respective responses from the first voice assistant service and a second voice assistant service; and coordinating performance of actions specified in the respective responses by determining whether the actions can be performed simultaneously without interference.

14. The method of claim 13, wherein coordinating performance of the actions comprises:

determining that a first action comprises audio playback and a second action does not comprise audio playback; and performing the first action and second action concurrently based on determining that the second action will not interfere with the audio playback of the first action.

15. A non-transitory computer-readable medium storing instructions that, when executed by one or more processors of a playback device, cause the playback device to perform operations comprising:

detecting, via one or more microphones of the playback device, a first voice input comprising a first wake word at a first time;

detecting, via the one or more microphones, a second voice input comprising a second wake word at a second time;

determining whether a time interval between the first time and the second time is less than a predetermined threshold;

when the time interval is less than the predetermined threshold:

enabling concurrent processing of both the first voice input and the second voice input;

transmitting data corresponding to the first voice input to a first voice assistant service; and transmitting data corresponding to the second voice input to a second playback device over a local area network.

16. The non-transitory computer-readable medium of claim 15, wherein the operations further comprise, when the time interval exceeds the predetermined threshold, forgoing transmitting data corresponding to the second voice input to the second playback device.

17. The non-transitory computer-readable medium of claim 15, wherein the operations further comprise, responsive to enabling concurrent processing of both the first voice input and second voice input, receiving a first response from the first voice assistant service and a second response from a second voice assistant service, wherein at least one of the first response or the second response comprises instructions to perform a playback action.

18. The non-transitory computer-readable medium of claim 15, wherein:

the first wake word is associated with the first voice assistant service;

the second wake word is associated with a second voice assistant service different from the first voice assistant service; and the first voice assistant service and second voice assistant service are configured to process voice inputs concurrently.

19. The non-transitory computer-readable medium of claim 15, wherein detecting the first voice input comprises:

obtaining sound data corresponding to the detected first voice input;

analyzing the sound data via a first wake word engine to detect the first wake word; and analyzing the sound data via a second wake word engine to detect the second wake word, wherein the first wake word engine and second wake word engine operate concurrently.

20. The non-transitory computer-readable medium of claim 15, wherein the operations further comprise:

after enabling concurrent processing, receiving respective responses from the first voice assistant service and a second voice assistant service;

coordinating performance of actions specified in the respective responses by determining whether the actions can be performed simultaneously without interference;

determining that a first action comprises audio playback and a second action does not comprise audio playback; and performing the first action and second action concurrently based on determining that the second action will not interfere with the audio playback of the first action.

* * * * *